US010302787B2

(12) United States Patent
Uldall et al.

(10) Patent No.: US 10,302,787 B2
(45) Date of Patent: May 28, 2019

(54) SEISMIC DATA PROCESSING METHOD AND APPARATUS

(71) Applicant: MAERSK OLIE OG GAS A/S, Copenhagen K (DK)

(72) Inventors: Anette Uldall, Roskilde (DK); Katrine Juul Andresen, Skanderborg (DK)

(73) Assignee: MAERSK OLIE OG GAS A/S, Copenhagen K (DK)

( * ) Notice: Subject to any disclaimer, the term of this patent is extended or adjusted under 35 U.S.C. 154(b) by 307 days.

(21) Appl. No.: 15/028,212

(22) PCT Filed: Oct. 10, 2014

(86) PCT No.: PCT/EP2014/071811
§ 371 (c)(1),
(2) Date: Apr. 8, 2016

(87) PCT Pub. No.: WO2015/052334
PCT Pub. Date: Apr. 16, 2015

(65) Prior Publication Data
US 2016/0245940 A1  Aug. 25, 2016

(30) Foreign Application Priority Data

Oct. 11, 2013  (GB) .................................. 1318069.0
Jan. 17, 2014  (GB) .................................. 1400831.2

(51) Int. Cl.
*G01V 1/30* (2006.01)
(52) U.S. Cl.
CPC .............. *G01V 1/303* (2013.01); *G01V 1/307* (2013.01); *G01V 2210/61* (2013.01); *G01V 2210/624* (2013.01); *G01V 2210/6222* (2013.01)

(58) Field of Classification Search
CPC ......... G01V 2210/60; G01V 2210/622; G01V 2210/63
See application file for complete search history.

(56) References Cited

U.S. PATENT DOCUMENTS

| 4,571,710 A | 2/1986 | Neidell et al. |
| 5,233,568 A | 8/1993 | Kan et al. |
| 5,343,440 A | 8/1994 | Kan et al. |
| 5,586,082 A | 12/1996 | Anderson et al. |

FOREIGN PATENT DOCUMENTS

| EP | 0812429 A1 | 12/1997 |
| EP | 0896677 A1 | 2/1999 |

OTHER PUBLICATIONS

International Search Report PCT/ISA/210 for International Application No. PCT/EP2014/071811 dated Feb. 10, 2015.
Written Opinion of the International Searching Authority PCT/ISA/237 for International Application No. PCT/EP2014/071811 dated Feb. 10, 2015.
Loseth H. et al.: "Hydrocarbon leakage interpreted on seismic data", Marine and Petroleum Geology, Butterworth Scientific, Guilford, GB, vol. 26, No. 7, Aug. 31, 2009, pp. 1304-1319.

*Primary Examiner* — Cheung Lee
(74) *Attorney, Agent, or Firm* — Harness, Dickey & Pierce, P.L.C.

(57) ABSTRACT

A method of identifying at least one fluid migration feature comprises receiving seismic data and processing the seismic data to identify the at least one fluid migration feature, wherein the seismic data comprises speed or velocity data and/or seismic amplitude data.

14 Claims, 19 Drawing Sheets

SEISMIC DATA PROCESSING METHOD AND APPARATUS

FIELD

The present invention relates to a method and apparatus for processing seismic data, for instance for processing seismic velocity data. The method and apparatus may be for obtaining information concerning geological structures, for example vertical anomalies, that may represent a fluid migration route.

BACKGROUND

It is very well known to use a wide range of different measurement and data processing techniques to obtain information concerning geological formations that may contain oil, gas or other hydrocarbons.

Hydrocarbon-rich deposits are often present in relatively complex geological formations, and the likelihood of whether hydrocarbons are present or absent in a particular location can depend on whether and how the hydrocarbon deposits have migrated over time and/or in dependence on geological events.

SUMMARY

In a first aspect of the invention there is provided a method of identifying, for example determining the presence of, at least one geological feature, comprising receiving seismic data and processing the seismic data to identify the at least one geological feature, wherein the seismic data comprises speed or velocity data and/or amplitude data and/or volume data.

The at least one geological feature may comprise a fluid migration feature, for example a fluid migration route. A fluid migration feature may comprise a feature along which fluid may migrate, or along which fluid has or may have previously migrated.

The fluid may comprise a hydrocarbon fluid, for example oil or gas.

The at least one geological feature may comprise at least one anomaly, for example at least one substantially vertical anomaly. Any suitable criteria may be used to determine whether an anomaly, for example a speed, velocity or amplitude anomaly, is to be considered as a substantially vertical anomaly. For example, in some cases an anomaly may be determined to be a substantially vertical anomaly if its angle of inclination to the vertical (for example, a mean or median angle of inclination) is within a threshold angle of inclination, for example within 45° of the vertical, optionally within 30° of the vertical, optionally within 10° of the vertical, further optionally within 5° of the vertical. The threshold angle of inclination can in some cases be selected in dependence on a characteristic or characteristics of the speed, velocity and/or amplitude data and/or in dependence on a characteristic of the geology represented by the data. The threshold angle of inclination can be predetermined and/or selected by a user. In some cases, the selected angle of inclination (and/or other threshold properties to determine whether a substantially vertical anomaly or other anomaly is present) may be varied, for example within upper and lower bound, until a desired number, for example a predetermined target number, of substantially vertical anomalies is identified. Those identified substantially vertical anomalies can then be used to select features or sub-regions for further study or exploration.

The method may comprise mapping the at least one anomaly according to at least one of vertical extent, average velocity, one or more natural effects, initiation level, termination level, or relation to at least one other geological feature The at least one anomaly or other geological feature may comprise, or be associated with, at least one of a fracture, fault, depression, incision, karst feature, cap, channel, sinkhole, or reef feature.

The method may comprise determining at least one of a termination level or an initiation level of the anomaly from the velocity data and/or amplitude data, for example a velocity volume and/or amplitude volume obtained from the seismic data.

The at least one anomaly may be characterised by lower amplitudes and/or acoustically distorted intervals of the seismic data.

The processing of the seismic data may comprise processing the seismic data to identify at least one anomaly in the seismic data, for example at least one vertical anomaly. The processing of the seismic data may comprise processing the data to identify at least one speed or velocity anomaly, and/or at least one amplitude anomaly.

A speed or velocity anomaly may comprise a region for which value(s) of the speed of velocity data are different to the value(s) that may be expected. A speed or velocity anomaly may comprise a region for which value(s) of speed or velocity data are different to values of speed or velocity obtained for other regions at substantially the same vertical or horizontal position and/or obtained for other regions having similar geological properties and/or for other regions in the same interval and/or in comparison to average speed or velocity values. In some cases a speed or velocity or amplitude anomaly may be identified as being a region providing substantially lower (or higher) speed or velocity or amplitude than adjacent regions for corresponding positions in the same stratum or strata and/or for corresponding vertical positions. Corresponding positions may for example be positions at the same depth beneath the surface, and/or positions having the same displacement in a direction perpendicular to the plane of the stratum (which may or may not be aligned parallel to the surface) and/or positions having the substantially the same vertical position in any chosen seismic reference frame. A vertical velocity anomaly may comprise a region that produces anomalous speed or velocity data and that extends for a significant distance in a substantially vertical direction.

The presence of a speed or velocity anomaly may for example be determined in dependence on whether the difference in the speed or velocity value(s) is greater than a threshold value, and/or whether the value of speed or velocity is less than (or greater than) a further threshold value. Any other suitable method may be used for determining whether speed or velocity values(s), or other value(s), for example amplitude values, are anomalous. For example, a thresholding to determine whether speed, velocity and/or amplitude values are anomalous may comprise determining whether the speed, velocity and/or amplitude values for a particular region are different by a greater than a threshold amount from surrounding or adjacent regions, for example regions at the same vertical and/or horizontal position and regions in the same strata. The threshold amount may, for example comprise an absolute amount or a percentage or proportion, for example in some cases a difference of at least 80%, optionally at least 50%, optionally at least 20%, optionally by any other suitable value optionally selected in dependence on characteristics of the particular seismic data and/or geology represented by the seismic data under consideration. The threshold may be predetermined and/or selected by a user. In some cases, the selected threshold values for speed, velocity and/or amplitude (and/or other threshold properties to determine whether a substantially vertical anomaly or other anomaly is present) may be varied, for example within upper and lower bounds, until a desired number, for example a predetermined target number, of anomalies is identified. Those identified substantially vertical anomalies can then be used to select features or sub-regions for further study or exploration.

The speed or velocity data may, for example, comprise interval velocity data.

The method may comprise determining whether an identified speed or velocity anomaly, or other anomaly, matches a predetermined pattern or possesses predetermined properties. The predetermined pattern or predetermined properties may represent a variation of velocity or speed with position, for instance lateral position. For example a pattern may be representative of higher velocity or speed at the centre of the velocity anomaly region and lower velocity or speed at least one edge of the velocity anomaly region, or vice versa. The velocity anomaly may comprise a composite velocity anomaly.

The method may further comprise selecting a region for further exploration or analysis in dependence on whether an anomaly is identified. The region may be selected in dependence on whether at least one anomaly is associated with said region, for example is proximate to, leads to or from said region, terminates or initiates at said region, or extends wholly or partly within said region. The region may be selected in dependence in on the number, concentration or size of anomalies associated with said region, for example the number, concentration or size of identified anomalies proximate to, leading to or from said region, terminating or initiating at said region, or extending wholly or partly within said region. The method may comprise making a prediction as to whether said selected regions contain hydrocarbons, for example oil or gas.

The further exploration or analysis may comprise, for example further processing of seismic or other data, performance of further seismic or other measurements, or performance of a physical intervention, for instance an exploratory drilling operation.

The method may comprise mapping where fluids, for example, hydrocarbon fluids, may have moved in dependence on the presence, position, size, concentration or other property of the identified at least one geological feature, for example the at least one anomaly.

In another aspect of the invention, which may be provided independently, there is provided a method of processing volume and/or speed/velocity to interpret fluid migration in seismic migrations.

In another aspect of the invention, which may be provided independently, there is provided a method of applying seismic velocities to interpret fluid migration from seismic sections and seismic velocities. Thus, it may be possible to map where fluids have moved. The fluids may comprise hydrocarbons.

The method may comprise performing seismic predictions (with the velocities) of mature source rocks.

In another aspect of the invention, which may be provided independently, there is provided an apparatus for identifying at least one geological feature, the apparatus comprising a processing resource configured to receive seismic data and to process the seismic data to identify at least one geological feature, wherein the seismic data comprises speed or velocity data and/or amplitude data and/or volume data. The at least one geological feature may comprise at least one fluid migration feature.

In another aspect of the invention, which may be provided independently, there is provided a computer program product comprising computer readable instructions that are executable to perform a method of identifying at least one geological feature, comprising receiving seismic data and processing the seismic data to identify the at least one geological feature, wherein the seismic data comprises speed or velocity data and/or amplitude data and/or volume data.

The apparatus and/or the computer program product may be configured to perform any method described herein, or any aspect or feature of such a method.

Features of one aspect of the invention may be applied to any other aspect of the invention in any appropriate combination.

DETAILED DESCRIPTION

Embodiments of the invention are now described, by way of non-limiting example with reference to the accompanying drawings, in which.

Figure 6:
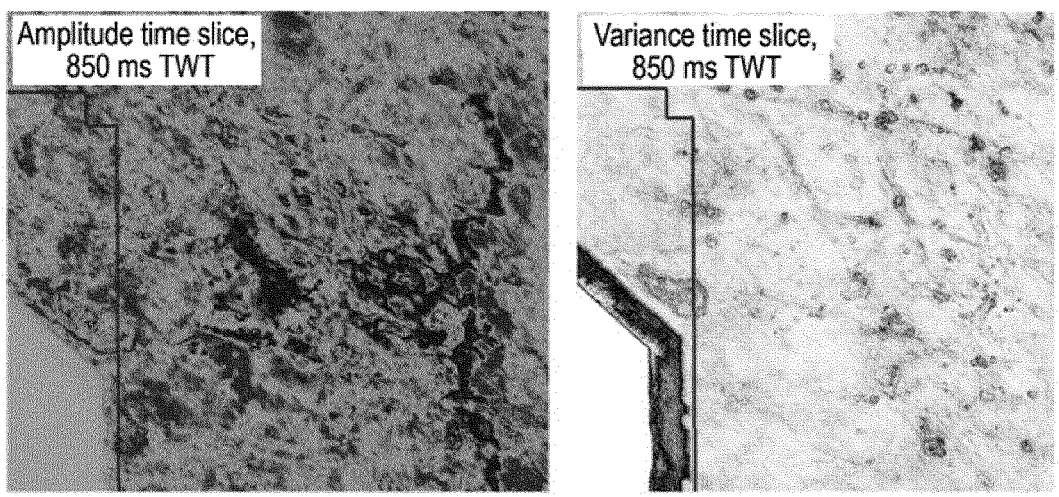
Figure 6:
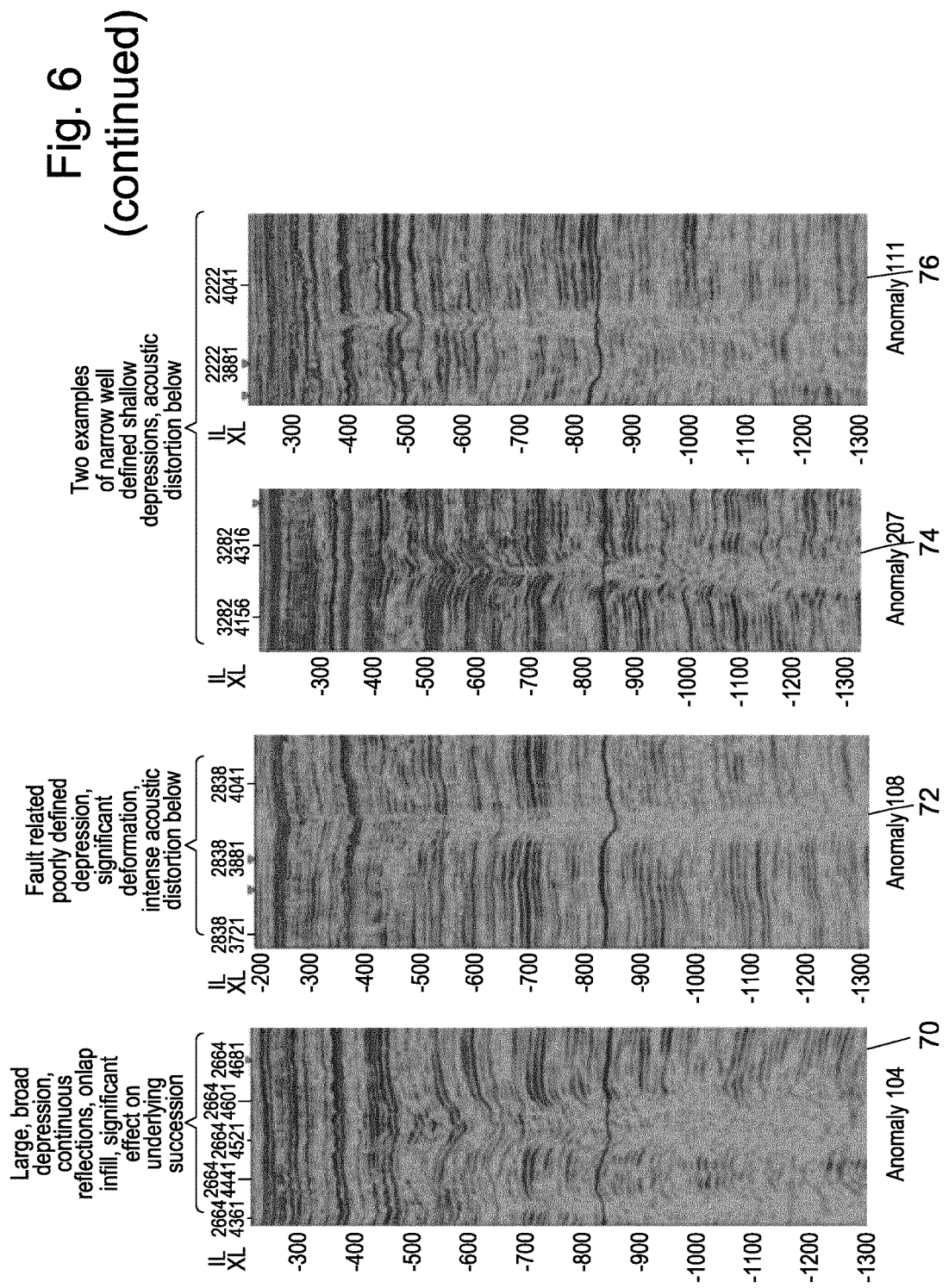
Figure 6:
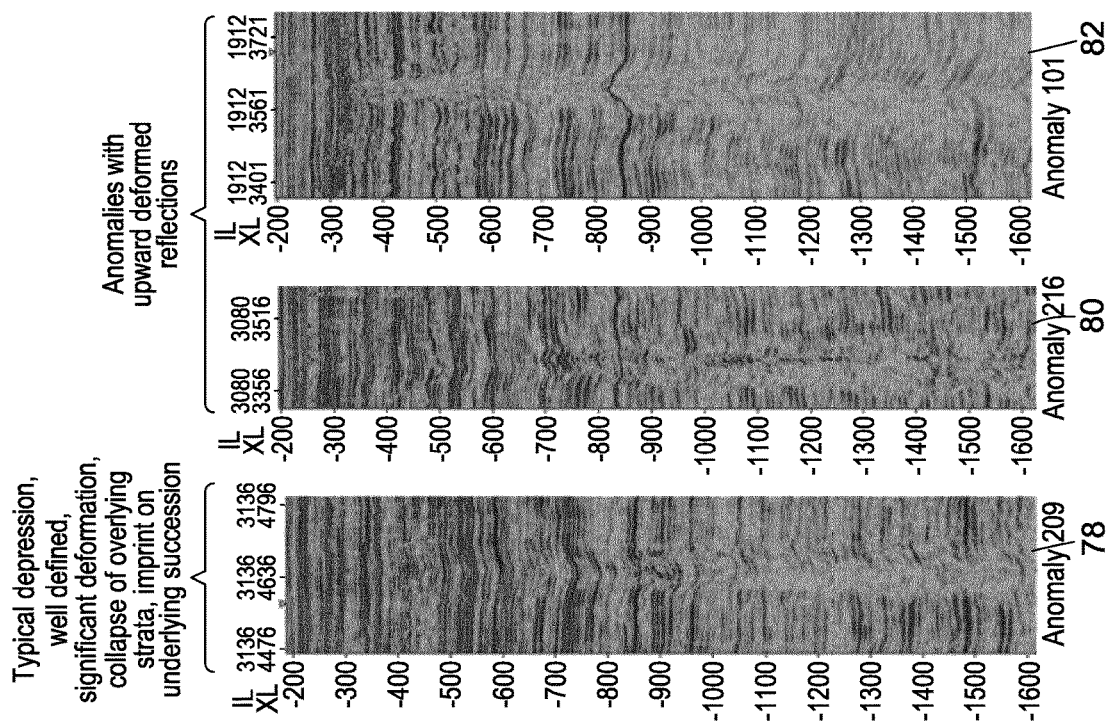
Figure 7:
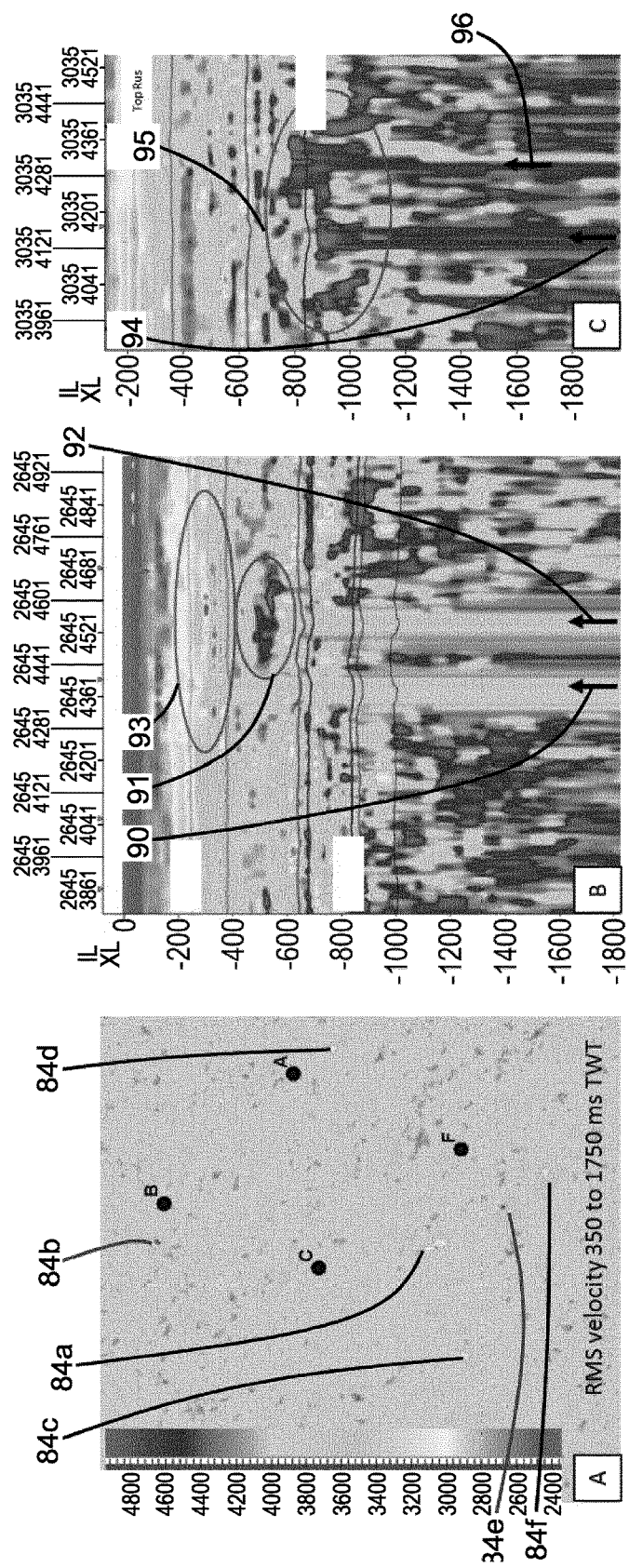
Figure 7:
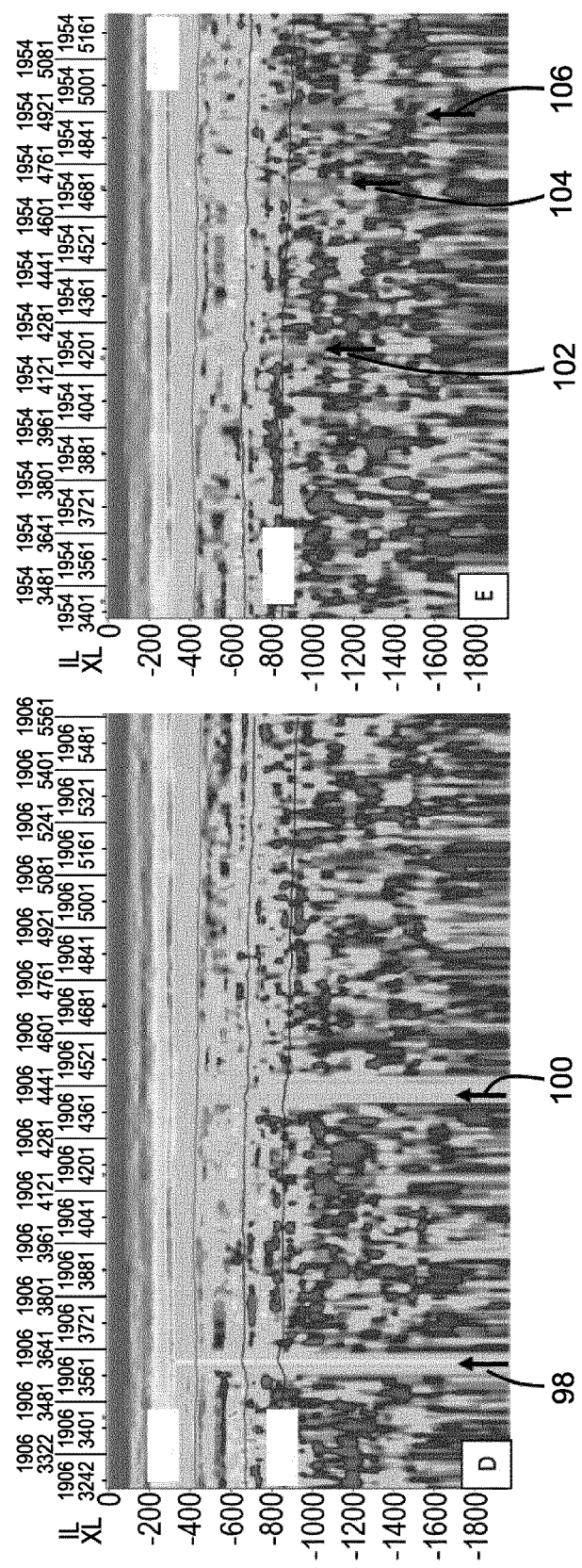
Figure 8:
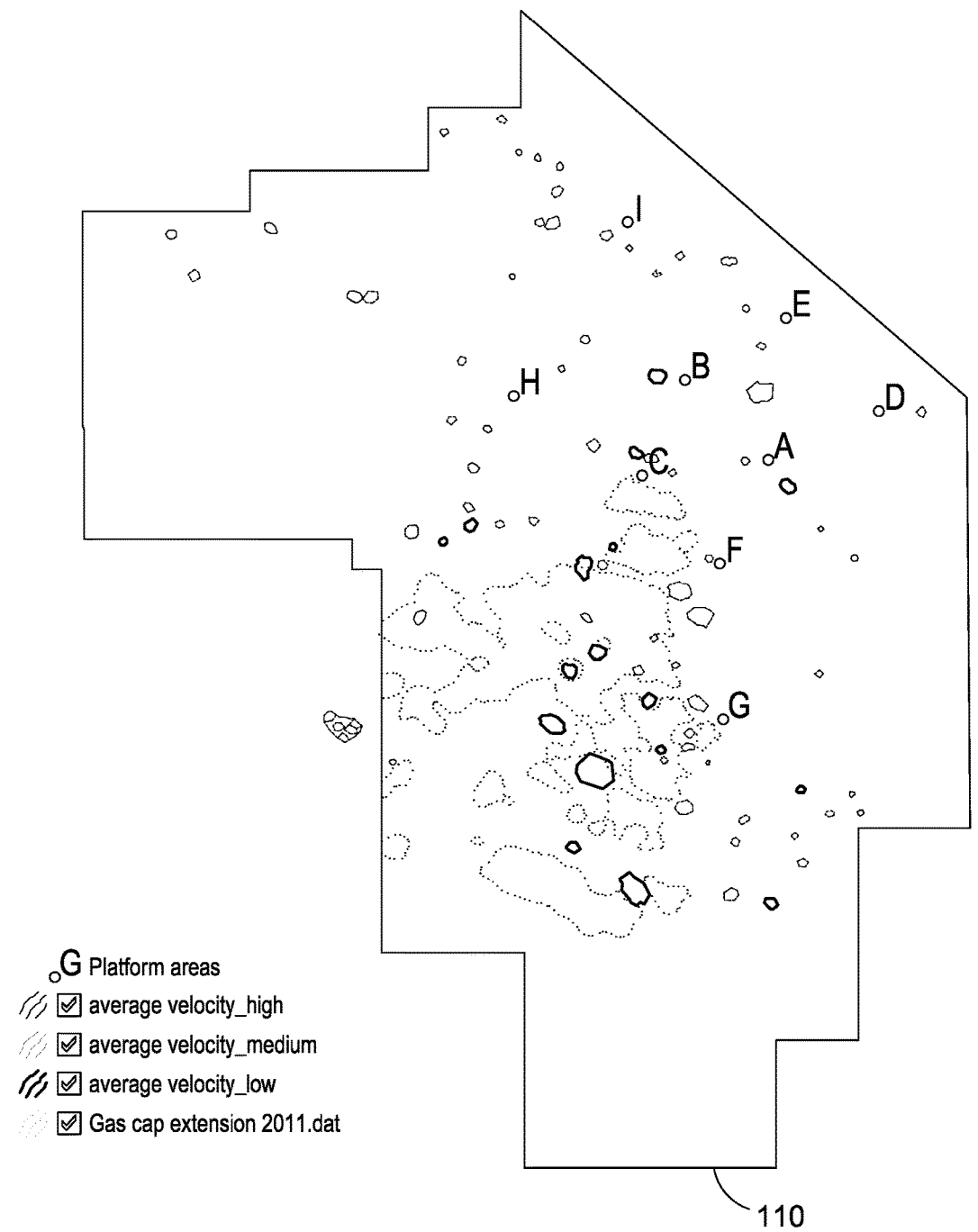
Figure 10:
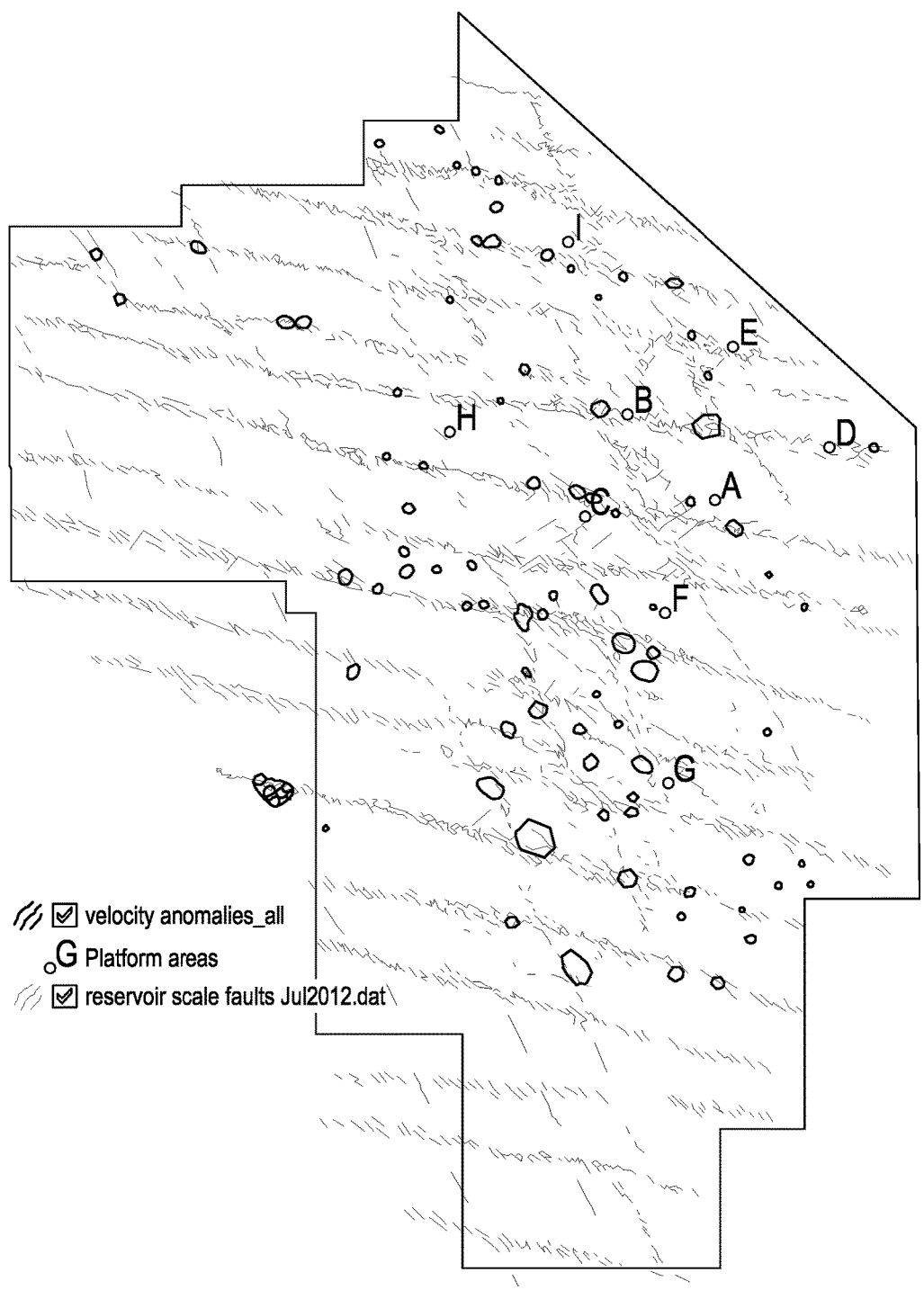
Figure 11:
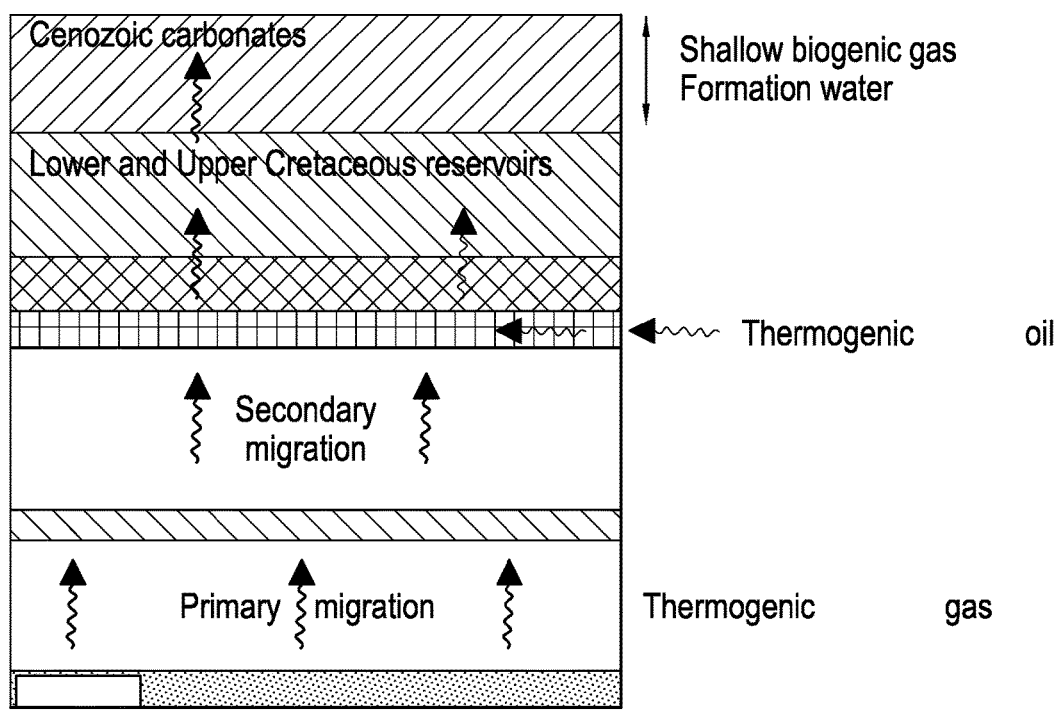
Figure 12:
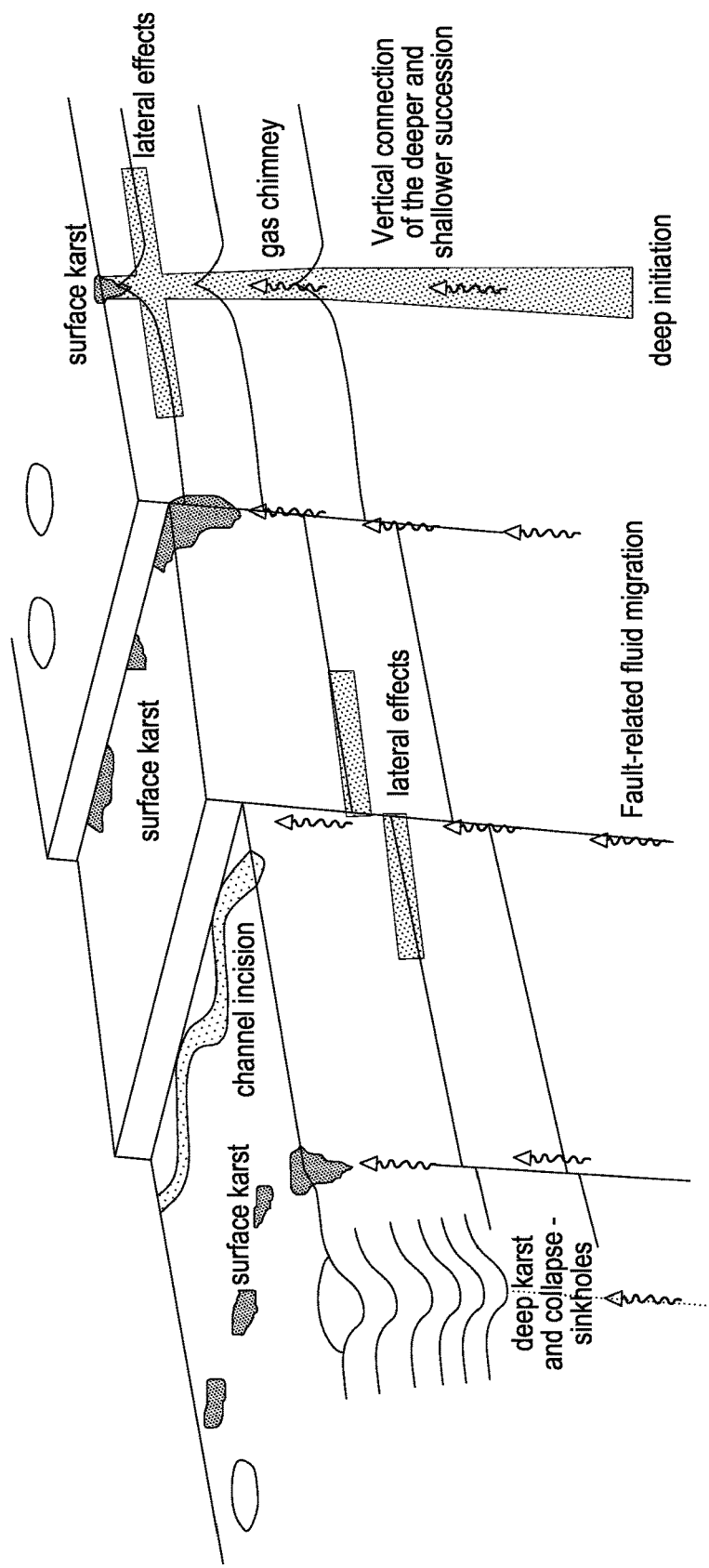

FIG. 6 provides amplitude volume and variance plots for various identified vertical anomalies;

FIG. 7A is a plot of RMS velocity in the interval 350-1750 ms TWT;

FIGS. 7B to 7E are vertical cross section plots, each showing one or more vertical velocity anomalies;

FIG. 8 is a map view, showing the location of velocity anomalies as the features and indicating the distribution of the velocity anomalies with respect to average velocity;

FIGS. 9a to 9d are map views, representing initiation levels (FIGS. 9a and 9b) and termination levels (FIGS. 9c and 9d) of mapped vertical anomalies;

FIG. 10 is a map view showing a distribution of velocity anomalies in elation to other shallow and/or seafloor anomalies and reservoir scale faults;

FIG. 11 is a simplified diagram showing API variations of fluids in the study area; and FIG. 12 is a diagram (not to scale) illustrating possible relations between fluid migration and faults, surface karst, sinkholes, and gas chimneys.

Methods according to described embodiments can be performed by a suitable processing device or system, for example a system comprising a suitably programmed processor and associated memory. Methods in some embodiments are performed using a suitably programmed desktop computer or portable computer.

Figure 1:
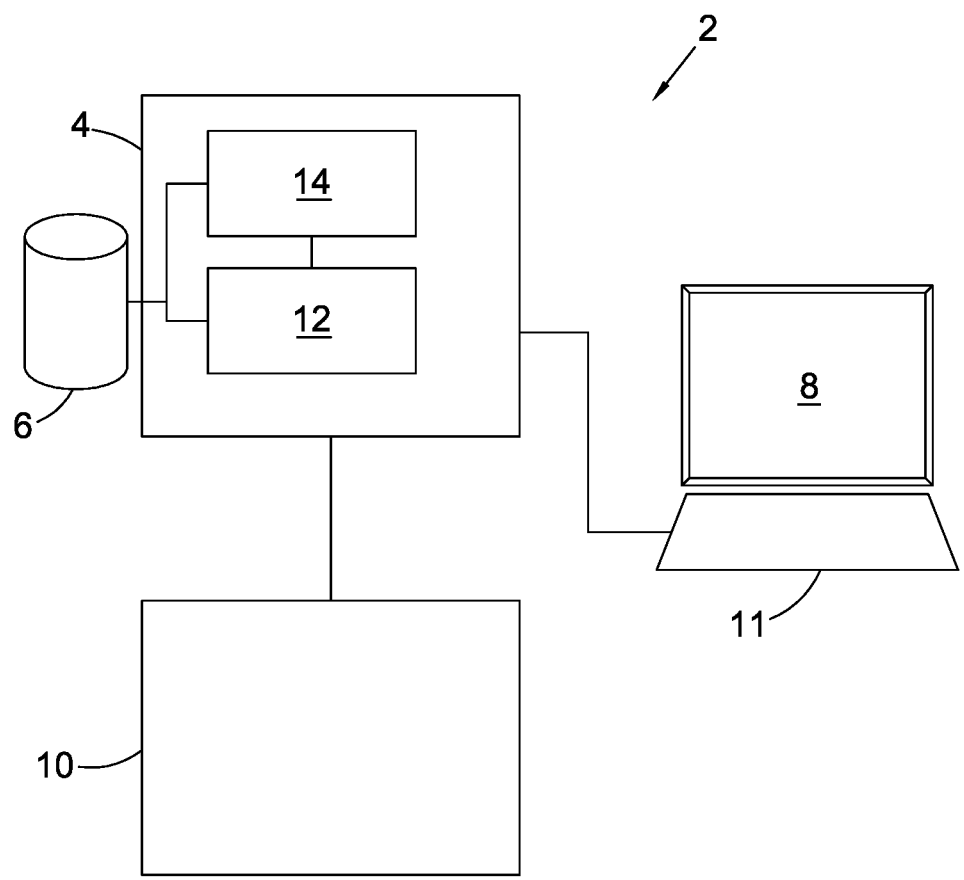
FIG. 1 is an illustration of a processing system according to an embodiment.

In one embodiment, illustrated in FIG. 1, the processing system comprises a computing apparatus 4, in this case a personal computer (PC) or workstation, which is connected to a data store 6, a display screen 8 and an input device or devices, such as a computer keyboard 11 and mouse. In the embodiment of FIG. 1, the computing apparatus 4 includes an anomaly identification module 12 and a seismic data processing module 14 configured to process seismic data to identify anomalies, for example vertical anomalies, in seismic speed/velocity and/or seismic amplitude data. Any suitable speed/velocity and seismic amplitude data can be used. In the study described below in relation to the embodiment of FIG. 1, interval velocities derived from RMS velocities are used. In this case, the interval velocities were derived from the RMS velocities using the Dix method, but any suitable method of deriving the interval velocities can be used.

In alternative embodiments, the display screen is a touch screen, which also acts as an input device. In further embodiments, the computing apparatus is a mobile device, for example a tablet computer. Seismic data may be stored locally in the data store, or may be accessed from a remote source by the computing apparatus, for example over a network. The seismic data are obtained using any suitable known seismic measurement technique.

In the embodiment of FIG. 1 the computing apparatus 4 can be connected to a seismic measurement system 10 used to obtain seismic data via seismic measurements performed at a series of locations. Any suitable seismic measurement system may be used. In the case of the study described below relating to the region of FIG. 2, the computing apparatus 4 obtains previously logged seismic data, comprising 0-4 second TWT 3D seismic reflection amplitude data, from a remote data store rather than from the seismic measurement system directly.

As will be discussed in more detail below, the computing apparatus 4 is configured to process seismic speed/velocity data and/or seismic amplitude data to determine the presence of one or more geological features each comprising at least one fluid migration feature.

The operation of the computing apparatus 4 to process speed/velocity data and seismic amplitude data to identify fluid migration features is described in relation to a study concerning an oil/gas field. Oil production from the field that is the subject of this study relies on horizontal drilling and careful stimulation of the very thin and low-permeable Cretaceous carbonate reservoirs. Although the field has been in production some uncertainties remain, particularly concerning fluid migration routes and charging of the field. As discussed further below, it has been found that the field appears to be effected by vertical anomalies which have the potential to act as vertical migration paths for fluid migration possibly impacting fluid distribution and characteristics at present day reservoir levels.

Figure 2:
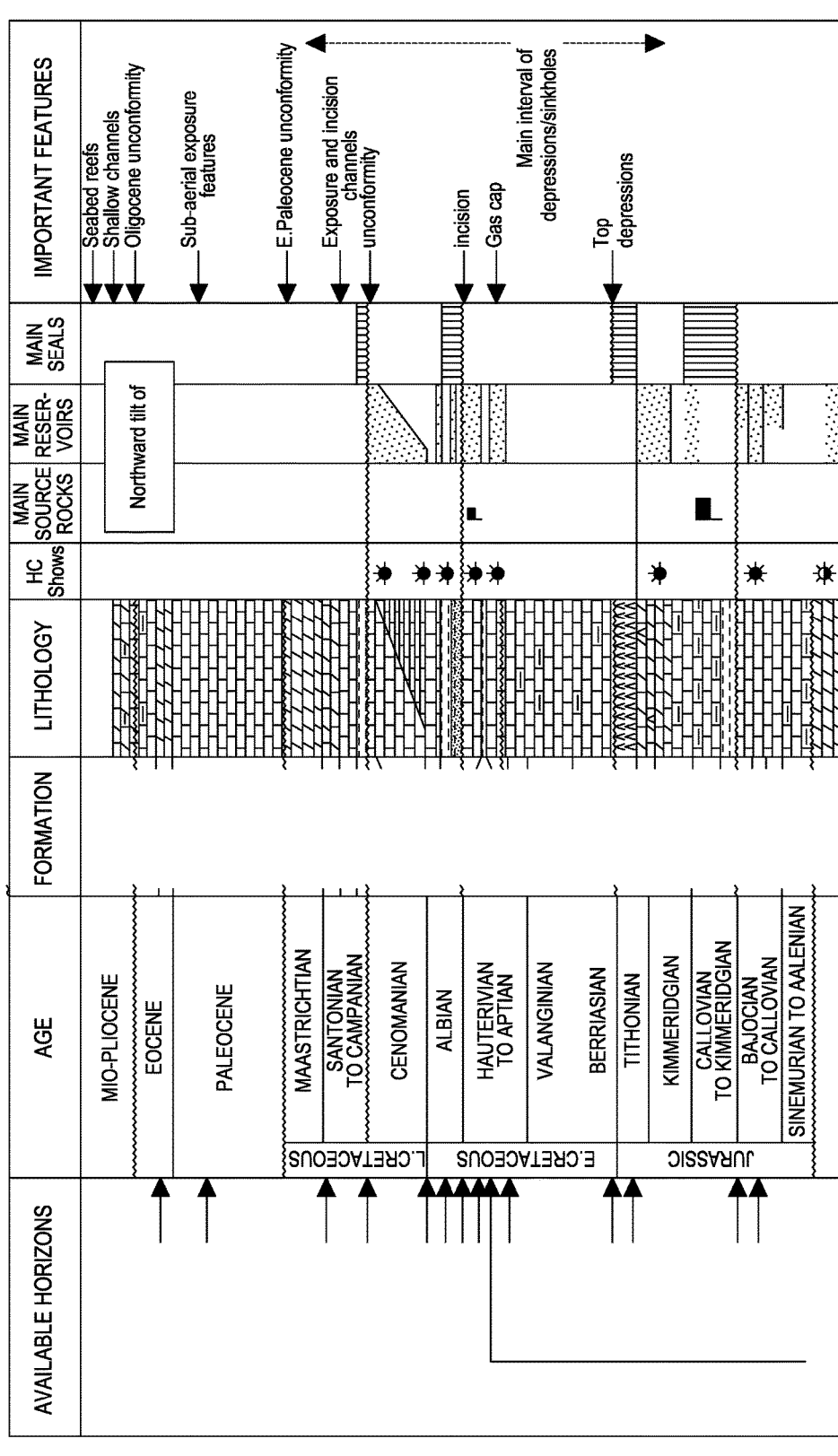
FIG. 2 is a schematic diagram showing stratigraphy and other elements in an area that is the subject of a study described herein.
Figure 2:
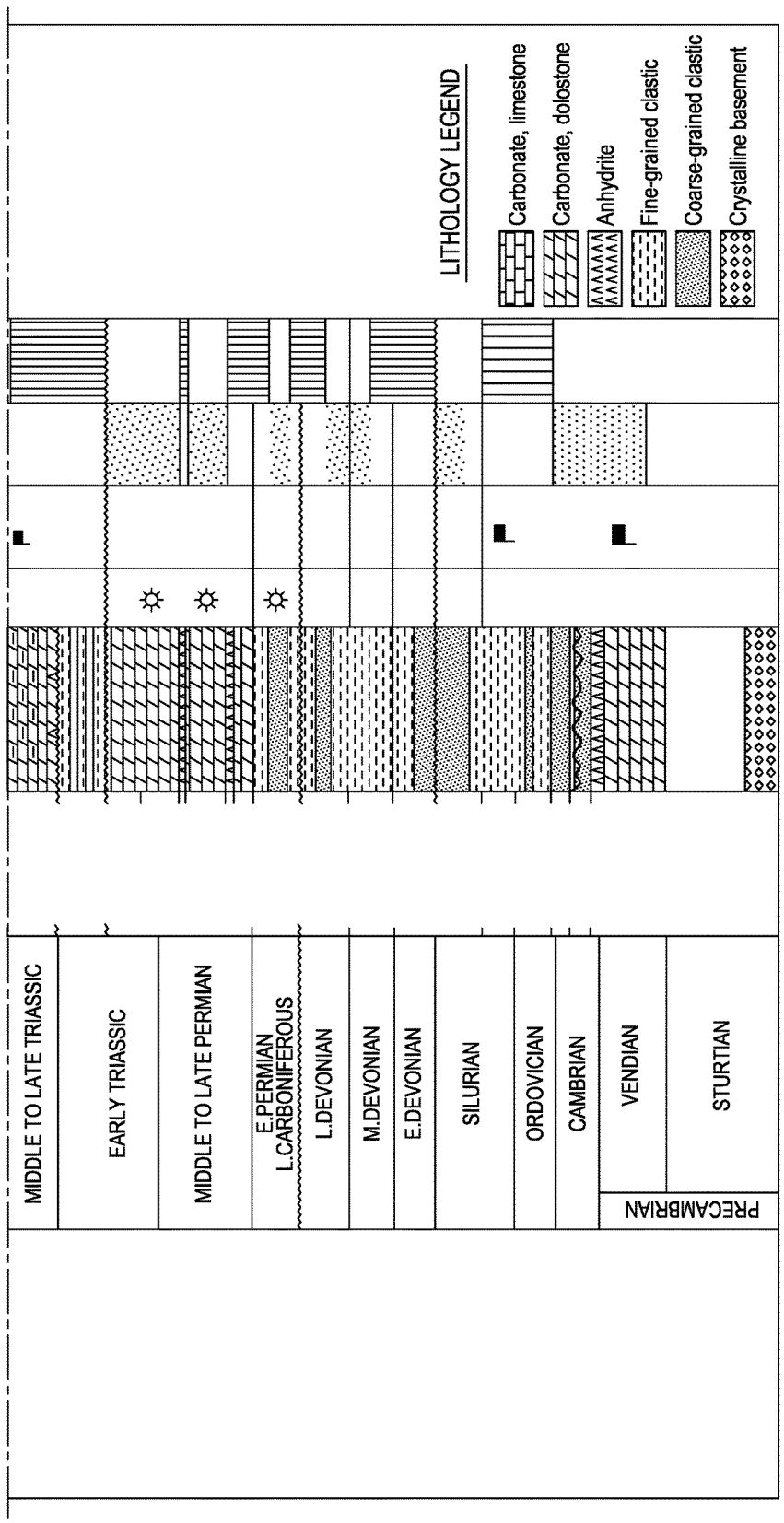
Figure 3A:
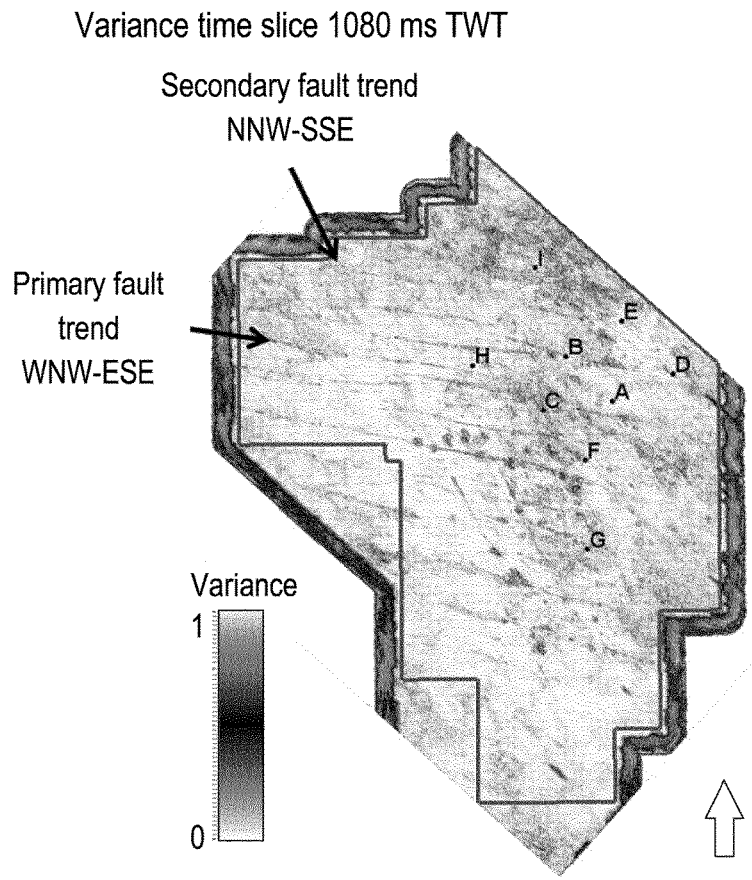
FIG. 3a is a map view presenting variance time slice data at 1080 ms TWT, showing two fault trends as linear elements of lower coherency.
Figure 3B:
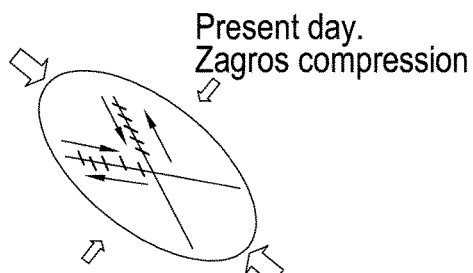
FIG. 3b shows a proposed strain ellipsoid for the fault system of the study area.
Figure 3C:
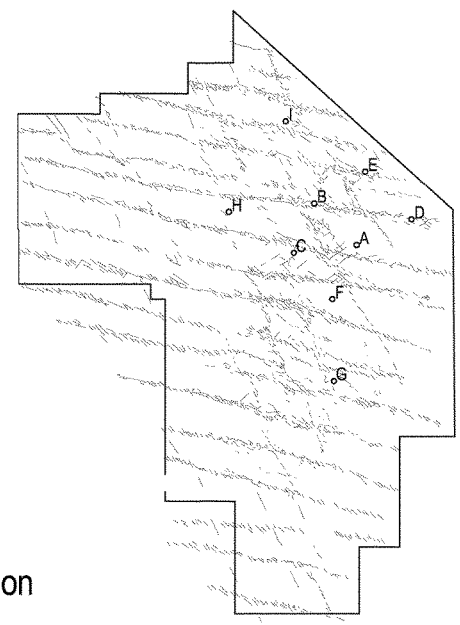
FIG. 3c shows a reservoir scale fault polygon used in the study.

Stratigraphy and main elements in the study area are shown schematically in FIG. 2, and main fault trends in the study area are shown in FIGS. 3a to 3c. FIG. 3a is a map view representing a variance time slice at 1080 ms TWT clearly showing the two fault trends as linear elements of lower coherency. The circular low coherency areas correspond to the vertical anomalies. FIG. 3b shows the proposed strain ellipsoid for the fault system and FIG. 3c is the reservoir scale fault polygon used in this study.

This study uses 3D seismic data combined with a calculated interval velocity volume to analyse the vertical anomalies in more detail. The anomalies are vertically extensive and typically characterized by lower velocities than the surrounding strata. They have been mapped according to their vertical extent, average velocity, any associated lateral effects, initiation and termination levels and their relation to other features in the area.

The results of the mapping suggest that the majority of the velocity anomalies are related to fluid migration with gas causing the anomalous low velocities. The present day gas cap may have formed due to vertical migration of gas along the velocity anomalies, which in the area of the gas cap are associated with very low velocities and all terminate at the level of the reservoir. In the areas north of the gas cap, the velocity anomalies generally terminate shallower suggesting that fluid venting probably continued to the seafloor thereby preventing gas accumulation in the reservoirs.

As is discussed in more detail below, the study successfully implements velocity data in the analysis of fluid migration routes and supplements the current understanding of some of the uncertainties. The results represent new inputs to the characterisation of fluid migration within the reservoirs and the existing production and may furthermore provide new input in the assessment of the future development of the field.

Figure 4:
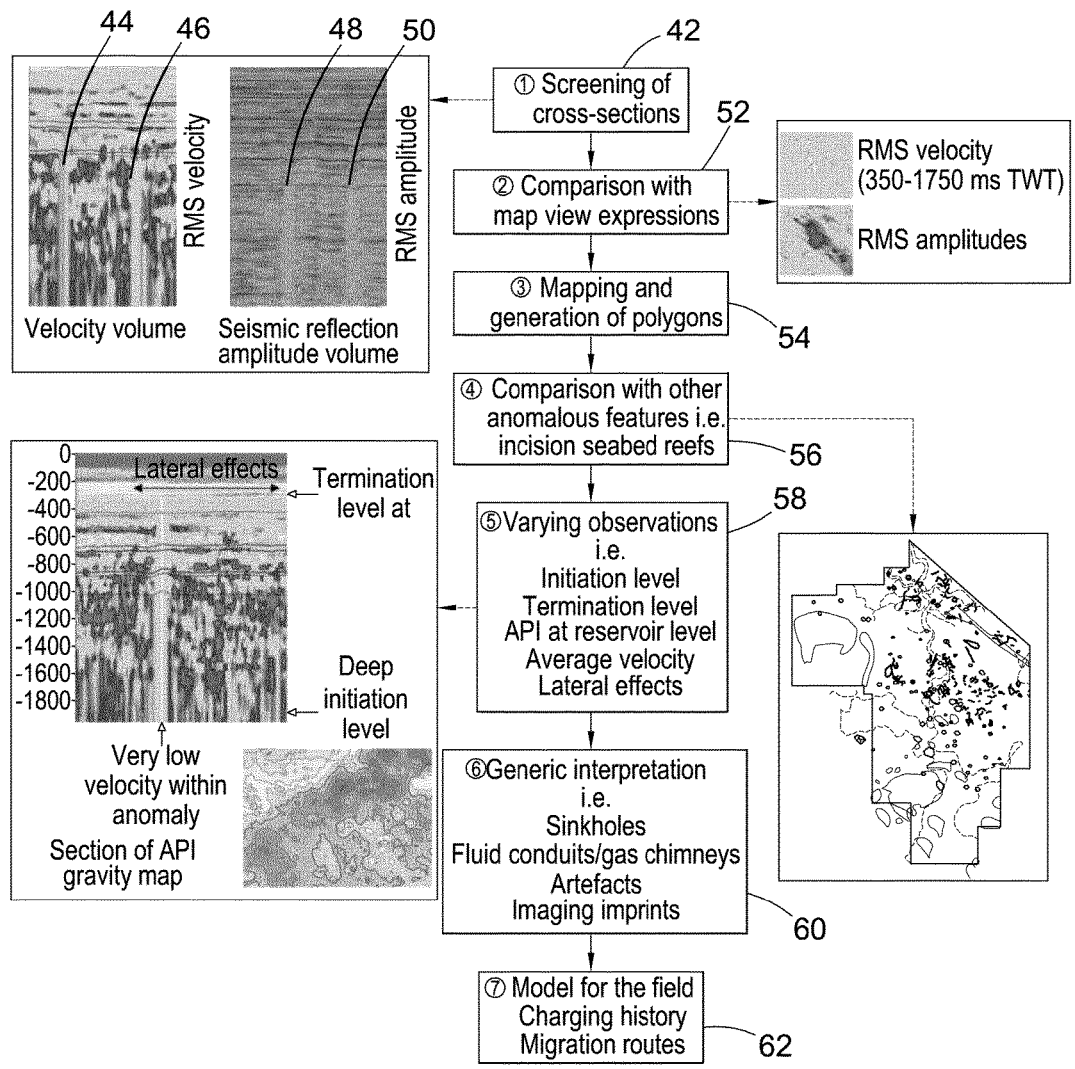
FIG. 4 is a flow chart illustrating a method used by the computing apparatus of FIG. 1 to process seismic speed/velocity data and/or seismic amplitude data.

The method used by the computing apparatus 4 to process seismic speed/velocity data and/or seismic amplitude data is shown in overview in the flow chart of FIG. 4.

At the first stage 42 of the method, the seismic data processing module 14 of the computing apparatus 4 receives and processes seismic velocity and amplitude data from the seismic measurement apparatus or, in this case, from a data store.

Figure 5:
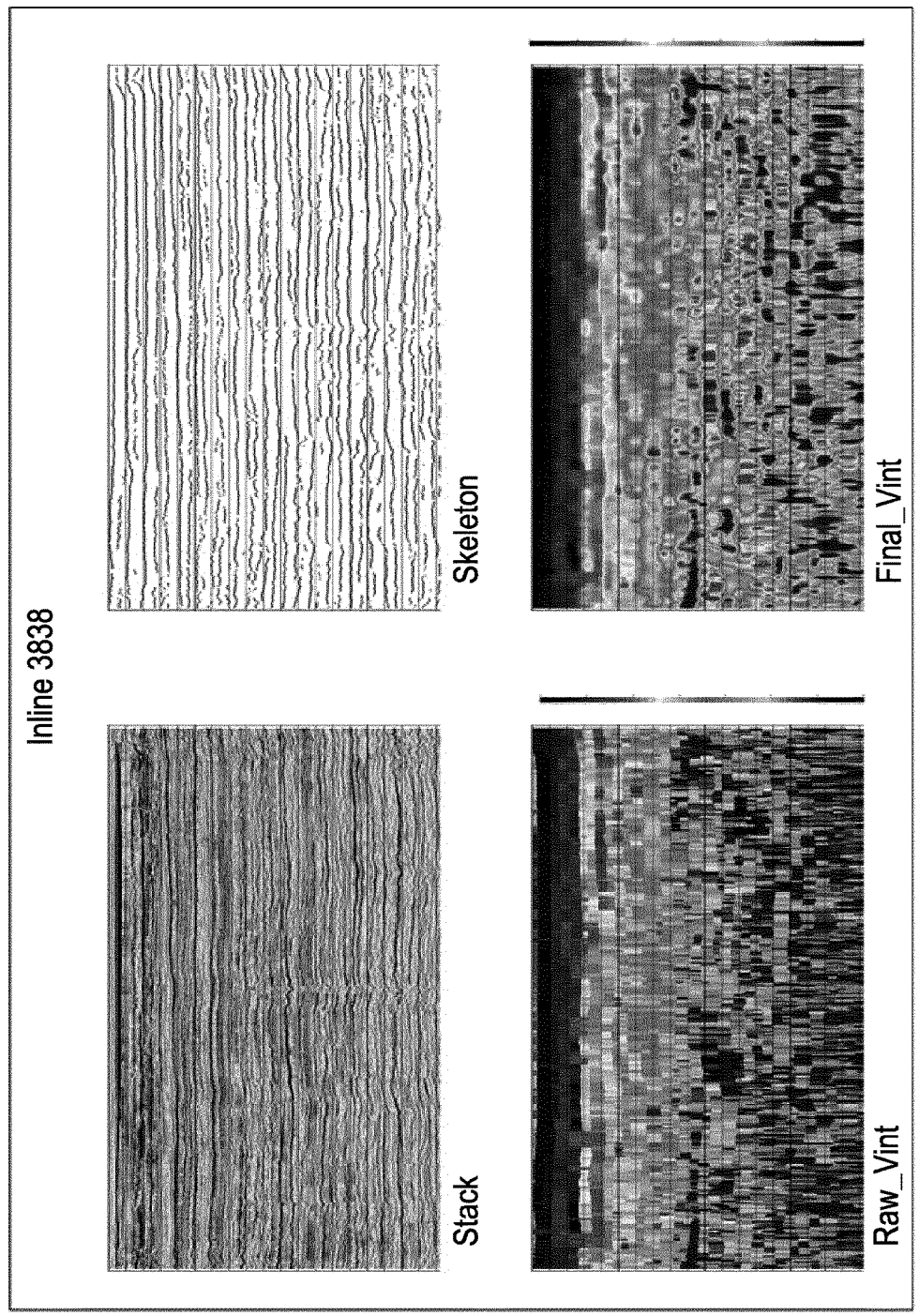
FIG. 5 is an illustration of flow for a computation of interval velocities, with the original stack shown on the upper left plot, a derived skeleton on the upper right plot, raw interval velocities with no smoothing shown on the lower left plot, and a final loaded interval velocity volume shown on the lower right plot.

The seismic data in this case is a full 0-4 sec TWT 3D seismic reflection amplitude volume. Interval velocities were calculated from the pre-stack seismic data as input to the velocity volume analysed in the study. A skeleton was used in order to ensure better geological constraints on the interval velocities and strong smoothing (11×11 traces) were applied to the final volume. FIG. 5 is an illustration of the flow for the computation of interval velocities, with the original stack shown on the upper left plot, the derived skeleton on the upper right plot, raw interval velocities with no smoothing shown on the lower left plot, and the final loaded interval velocity volume shown on the lower right plot, where 11×11 smoothing has been applied.

The processing of the seismic data at stage 42 comprised screening velocity and amplitude cross-sections to identify the presence of possible anomalies, in particular vertical anomalies in cross-sections of the seismic velocity and amplitude data. Two examples 44, 46 of possible vertical anomalies in RMS velocity data for one cross-section of the study are indicated in the velocity plot to the left of box 42 in FIG. 4. Corresponding possible vertical anomalies 48, 50 in amplitude data are shown in the amplitude plot to the left of box 42 in FIG. 4. Velocity anomaly 44 occurs at substantially the same position as amplitude anomaly 48, and velocity anomaly 46 occurs at substantially the same position as amplitude anomaly 50.

In the present case the vertical anomalies are identified as being regions in the velocity (or amplitude) cross-sections for which the values of velocity (or amplitude) are significantly different, either lower or higher, than other values of velocity (or amplitude) at substantially the same vertical position. The possible vertical anomalies can be identified by a user for example from inspection of map views and/or cross-section velocity (or amplitude) plots. In the case of such manual identification by a user, the use of automatically calculated RMS amplitude/velocity maps can help to identify areas in which to look for or validate the anomalies. Alternatively, the possible anomalies can be identified automatically by the anomaly identification module 12 of the computing apparatus 4.

For example, according to one automatic mode of operation the anomaly identification module 12 determines whether each velocity data point in the cross-section may belong to a possible vertical anomaly in dependence on whether the value of the velocity at that data point differs from the average velocity value for data points at the same vertical position, or corresponding position in the same stratum or strata by greater than a threshold amount. The anomaly identification module repeats the process for each data point in the velocity (or amplitude) cross-section to identify those data points (which may be referred to as anomalous data points) that seem to represent velocity (or amplitude) anomalies.

The anomaly identification module 12 then determines whether the identified anomalous velocity (or amplitude) data points form a region that may represent a vertical anomaly. For example, in one mode of operation the anomaly identification module 12 determines whether there are connected anomalous data points forming a region of sufficient length and/or width or volume to be identified as a potential vertical anomaly. For instance the anomaly identification module 12 may compare the vertical extent of a candidate anomaly formed from connected anomalous data points to a length threshold to determine whether the candidate anomaly should be considered to represent a vertical or other anomaly in the velocity (or amplitude data). Alternatively or additionally the anomaly identification module 12 can compare the width and/or volume and/or area and/or other size parameter of each candidate anomaly to width and/or volume and/or area and/or other size threshold(s) to make the determination. In some cases, the size threshold can effectively be set in the creation of the velocity volume by applying a lateral filter based on reflectors in the seismic data. The decision as to whether to disregard a region as a potential vertical anomaly may depend on how well-defined the region is and the context in which it was observed, as well as on the size of the region.

Any other suitable automatic method or partially-automatic method may be used by the anomaly identification module 12 to identify vertical or other anomalies in the speed/velocity or amplitude data, including any suitable thresholding, edge detection, clustering or pattern matching methods.

At the end of stage 42, vertical anomalies in the velocity and/or amplitude data have been identified. At the next stage 52, the computing apparatus 4 maps the vertical anomalies in the velocity and/or amplitude data and compares the vertical anomalies in a map view with other map view expressions. Usually various anomalies may be seen in the seismic amplitude data, but only some of those are associated with a velocity anomaly. In the present study, the most significant vertical anomalies in the geology were mapped by implementing varying surface attributes, time slices of variance, correlation, amplitude and exact values for mapped horizons. The main criterion for mapping a vertical anomaly in the geological structure in the present study was however the association with a significant velocity anomaly in order to discriminate between anomalies that may be conduits for hydrocarbon flow and those that might cemented or otherwise blocked.

In some cases at stage 52, vertical anomalies present in one or more of RMS velocity and amplitude, time slices of variance, amplitude and velocity, and exact values for mapped horizons are rejected as not representing possible vertical geological features of relevance if no corresponding significant vertical anomaly in the velocity data is identified.

At the next stage 54, each of the remaining candidate regions representing vertical anomalies are mapped and polygons are generated to represent the shape of the vertical anomalies in the horizontal plane. In some cases a full 3D representation of each anomaly, for example a 3D representation of the boundary of each anomaly can be generated using any suitable method of mapping 3D shapes.

Upon mapping the vertical anomalies, their relations to overlying and underlying features may be tested at stage 56 in order to distinguish true vertical anomalies from varying imaging artifacts. This included relation to faults, gas caps and incisions at reservoir levels, shallower karst features and channels, seabed reefs and data related artifacts. Well-data concerning fractures, faults and actual depressions can also be used wherever an anomaly is intersected by a horizontal well with available data.

At the next stage 58, termination and initiation levels of each vertical anomaly are observed manually in the velocity and amplitude volumes. The termination level for a vertical anomaly may be considered to be the highest point of the vertical anomaly, and the initiation level for a vertical anomaly may be considered to be the deepest point of the vertical anomaly. In alternative modes of operation, the termination and initiation levels of each vertical anomaly may be determined automatically by the computing apparatus 4 rather than by manual inspection of the velocity and amplitude volumes by a user.

Since, in the present study data, the velocity volume only had a time range of 2 sec TWT the deeper initiation levels were observed from the amplitude volume as the deepest level of acoustic disturbance and deformation. The average velocity within the vertical anomalies was noted, preferably at reservoir level. To accommodate manual errors, the velocity readings were subdivided into Low (2000-3000 m/s), Medium (3001-3500 m/s) and High (3501-5500 m/s) velocity groups.

At the next stage 60, an interpretation of the cause of the vertical anomalies was generated for the present study, and a model for the field was generated at stage 62.

A total of 84 vertical anomalies were mapped in the data of the present study of FIG. 2 and FIGS. 3a to 3c. The vertical anomalies are represented in the seismic amplitude and variance volume data, and in the seismic interval velocity volume.

Considering the seismic amplitude and variance volume data first, in the present study the vertical anomalies typically occur as circular low coherency features in map view sections such as those shown in FIG. 6, which shows characteristics of the vertical anomalies observed in the amplitude volume. On seismic cross-sections the anomalies have varying expressions, but the majority are characterized by lower amplitudes and acoustically distorted intervals, often comprising deformed reflections typically forming significant depressions. The depressions can be large structures up to a few km in diameter and 30 ms TWT in depth with visible internal onlapping reflections, or small narrow structures up to 500 m in diameter and 10 ms TWT in depth. Furthermore, the degree of continuity through the depressions varies in addition to how well the depressions are defined. The density of depressions in the amplitude volume varies with higher density at the top of the Jurassic period formation indicated in FIG. 2 (c. 850 ms TWT) and in the interval above the reservoirs (c. 300-600 ms TWT).

Considering FIG. 6 in more detail, amplitude volume plots for various ones of the anomalies are show in plots 70, 72, 74, 76, 78, 80, 82. The anomaly of plot 70 provides a large, broad depression, continuous reflections, onlap infill, significant effect on underlying succession. The anomaly of plot 72 is characterised by a fault-related poorly defined depression, significant deformation, and intense acoustic distortion below. The anomalies of plots 74 and 76 are two examples of narrow well-defined shallow depressions, with acoustic distortions below. The anomaly of plot 78 represents a typical depression for this study, with well-defined significance deformation, collapse of overlying strata, and imprint on underlying succession. The anomalies of plots 80 and 82 are anomalies with upward deformed reflections.

Turning to the appearance of the vertical anomalies of the study in seismic interval velocity volume data, the vertical anomalies are characterized in the velocity volume by vertically extensive areas of significantly lower velocities than the surrounding strata, as shown in FIGS. 7A to 7E, which shows characteristics of the vertical anomalies in the velocity volume.

FIG. 7A is a plot of RMS velocity in the interval 350-1750 ms TWT highlighting the main vertical anomalies in that interval as circular to semi-circular low velocity areas 84a. 84b, 84c, 84d 84e. The labels A, B, C, F in FIG. 7A represent the location of platform areas, as also shown in FIG. 8. The shown colour/shading legend on the left hand side of FIG. 7A, which indicates r.m.s. velocity value in meters/second, also applies to the vertical cross-sections shown in FIGS. 7B to 7E, each of which is a vertical cross section showing one or more vertical anomalies.

FIG. 7B shows two well defined vertical anomalies with medium velocity, different termination levels, and pronounced lateral effects. Arrows 90, 92 point along the length of the two vertical anomalies of FIG. 7B. The oval 91 shown in FIG. 7B is included to indicate the presence of low velocities spreading laterally from the vertical anomaly indicated by arrow 90, and is an example of different geological behaviour around a vertical anomaly, in this case pronounced lateral effects. The oval 93 shown in FIG. 7B is included to indicate the presence of a high velocity anomaly above the velocity anomaly indicated by arrow 92.

FIG. 7C shows two high velocity anomalies with significant lateral effects at their top. Arrows 94, 96 point along the length of the two vertical anomalies of FIG. 7B. The oval 95 shown in FIG. 7C is included to indicate the presence of the significant lateral effects associated with the high velocity anomalies, not hydrocarbon-related in this case.

FIG. 7D shows two very well defined low velocity anomalies with termination at the Eocene age level indicated in FIG. 2, where apparent lateral effects can be observed. Arrows 98, 100 point along the length of the two vertical anomalies of FIG. 7D.

FIG. 7E shows three shallow and poorly defined velocity anomalies. Arrows 102, 104, 106 point along the length of the three vertical anomalies of FIG. 7E.

FIG. 8 is a map view, showing the location of the velocity anomalies as the features outlined in green, red and yellow. The distribution of the velocity anomalies with respect to average velocity is indicated by the different colours, with high average velocity features indicated in red, medium average velocity features indicated in yellow, and low average velocity features indicated in green. Superposed as curved black lines is the outline of the inferred gas cap within the reservoir. The boundary of the study area is indicated by the polygon 110. Some seismic data is obtained for areas outside the study area, as can be seen from the presence in the figure of a velocity anomaly outside the boundary of the study area. The location of platform areas are indicated by the black dots labelled A, B, C, D, E, F, G, H and I in FIG. 8.

The majority of the mapped velocity anomalies are obvious from the mapped data but subtler features have also been mapped. Generally, the vertical anomalies are characterized by low velocities but a few pronounced anomalies with higher velocities also occur (see for example FIGS. 7C and 8). Composite velocity anomalies with, for instance, high velocities in the centre and low velocities at the edges have been observed. The areal distribution of the anomalies with respect to average velocity generally show low to medium velocity anomalies in the southern and central parts where an inferred gas cap occur in the reservoir succession, and high velocity anomalies in the northern part of the study area (FIG. 8). Lateral effects such as anomalous low or high velocity layers at the top of an anomaly or high velocities extending from the edges of an anomaly are frequently observed (see for example FIGS. 7B, 7C and 7D).

The main criterion for mapping a vertical anomaly in this study was, as mentioned, the association with a significant velocity anomaly. Therefore, vertical anomalies observed in the amplitude volume with no significant velocity anomalies have not been mapped in FIG. 7 or 8. Some vertical anomalies are only recognised in the velocity volume and have no expression in the amplitude volume. However, the major and larger anomalies of the study typically have a distinct signature in both the amplitude and the velocity volumes.

Figure 9A:
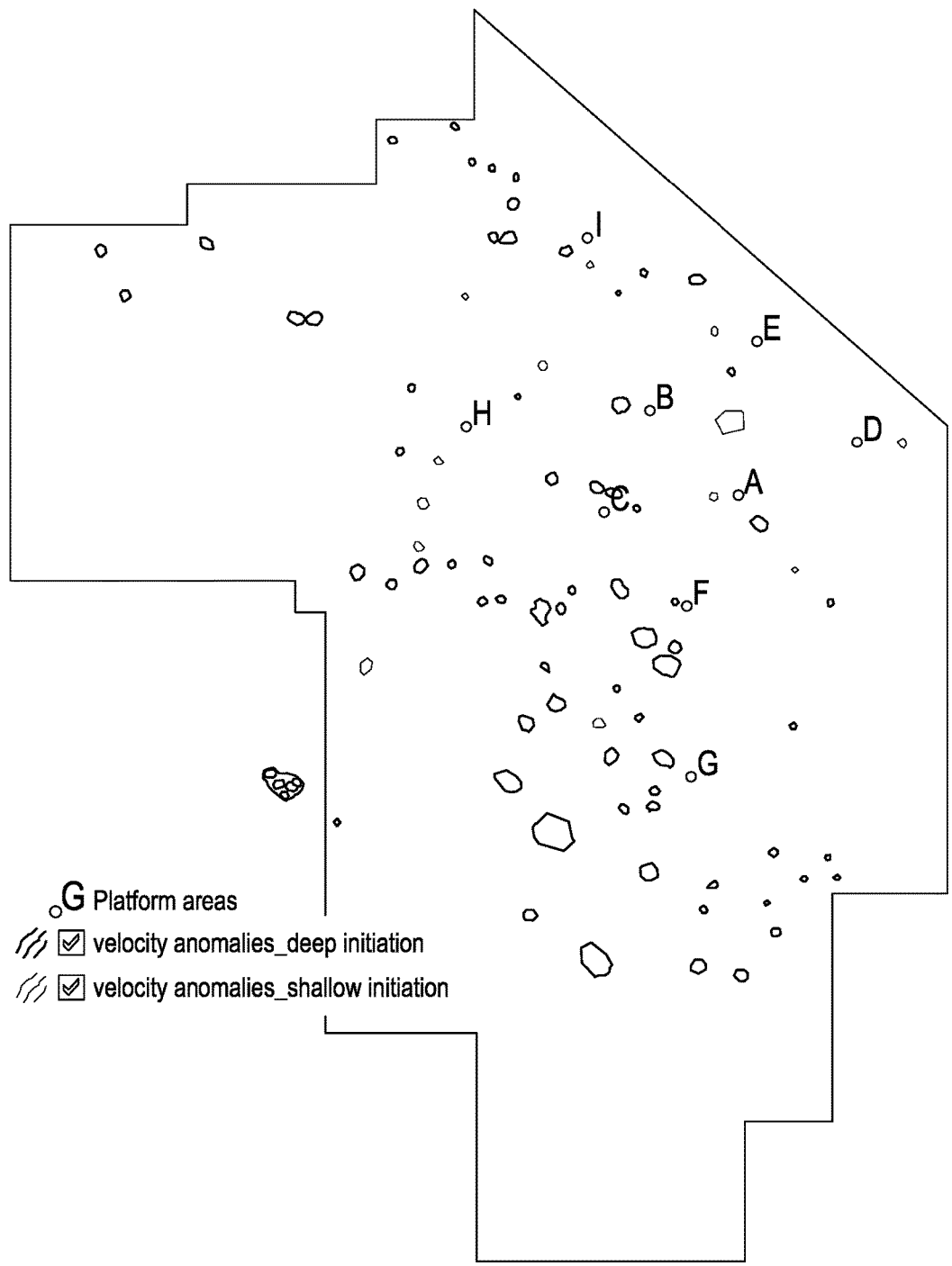
Figure 9B:
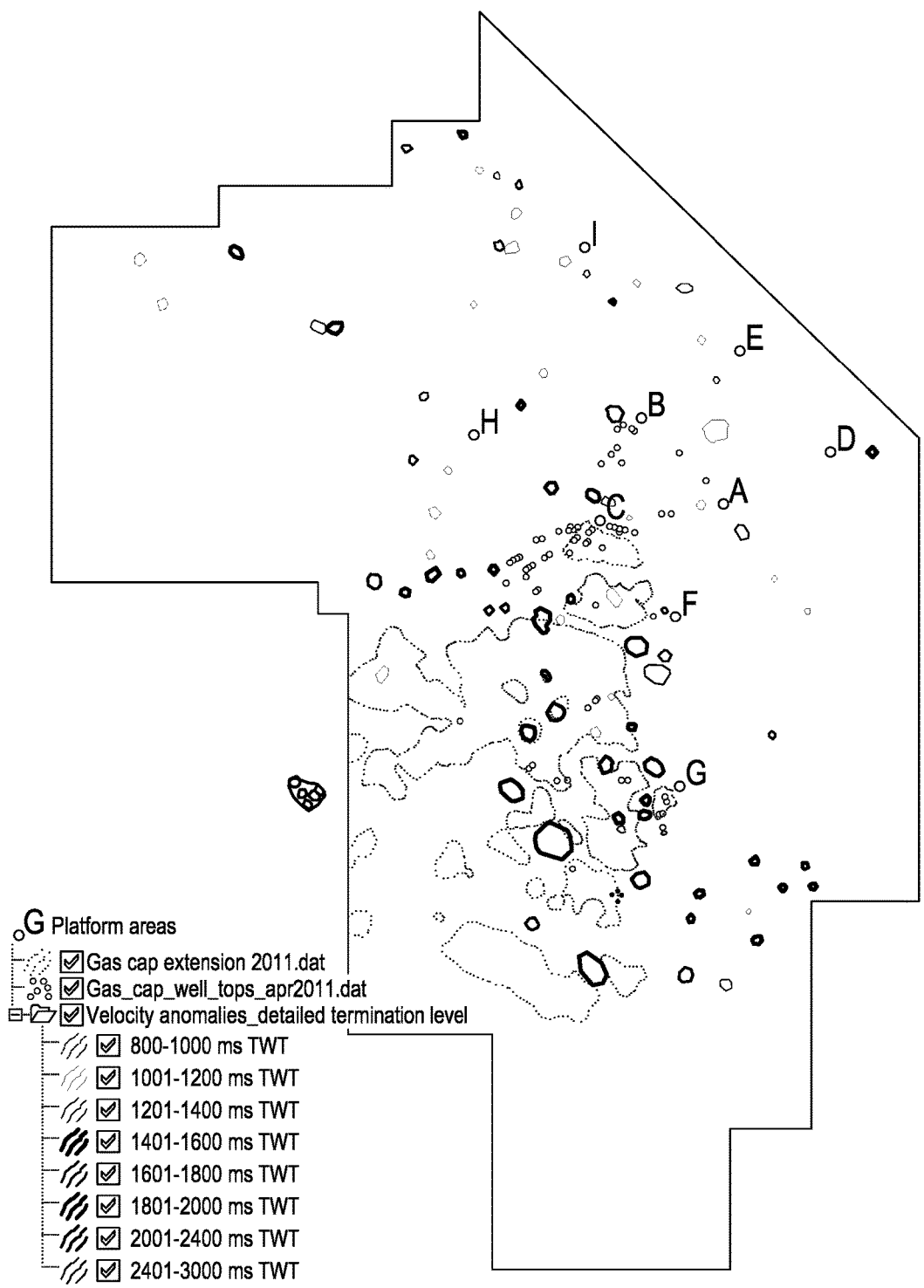
Figure 9C:
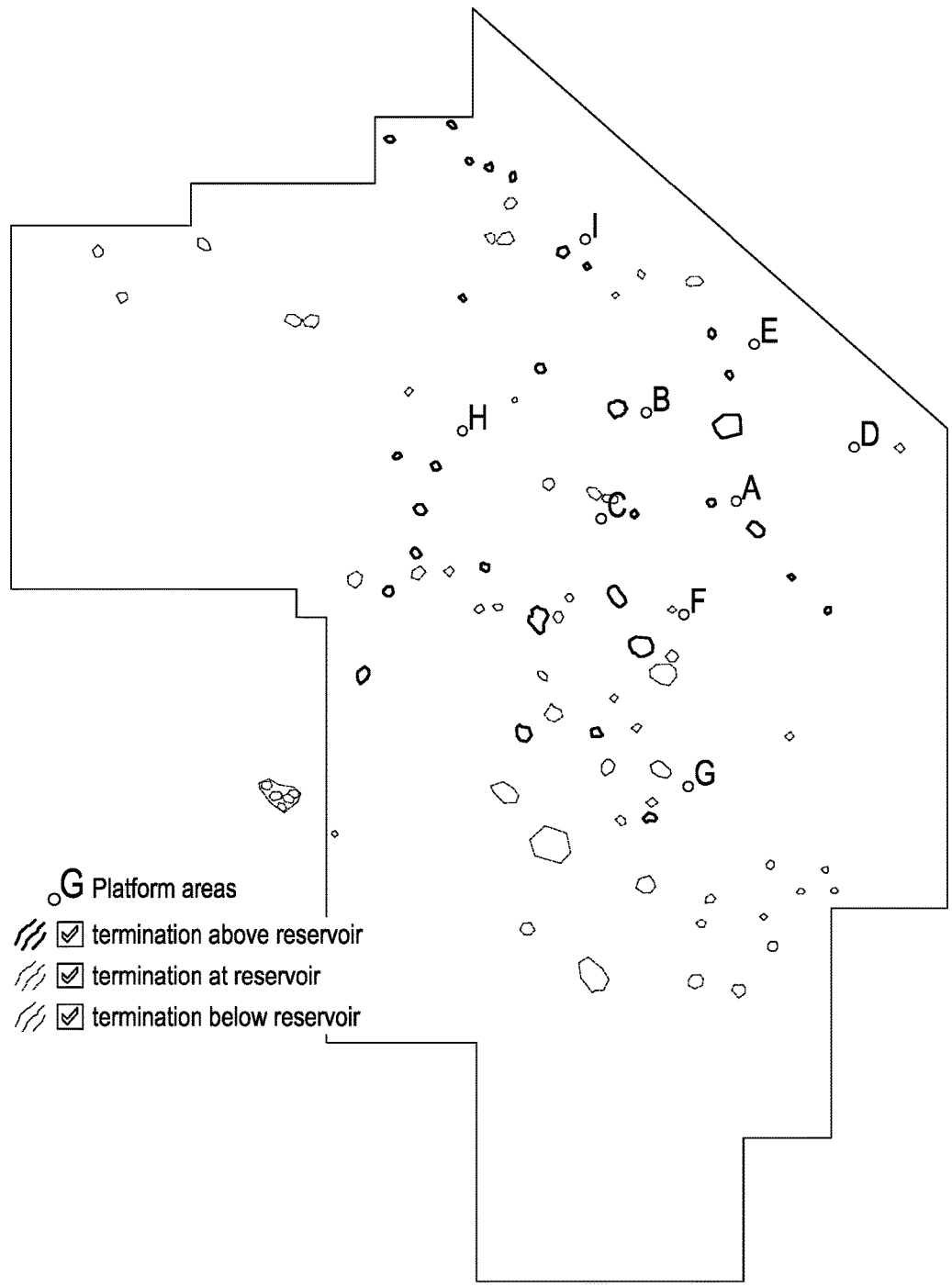
Figure 9D:
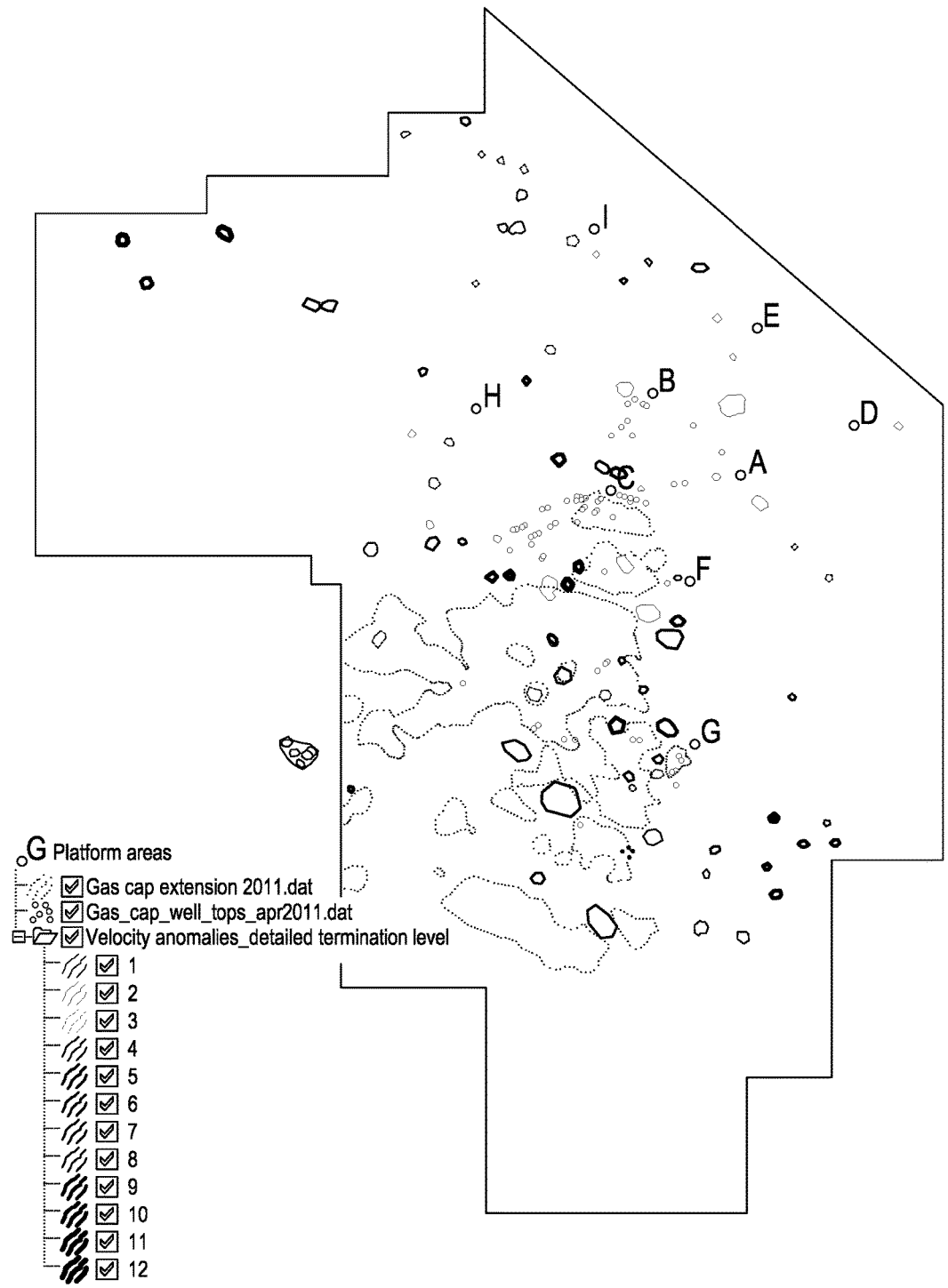

FIGS. 9a to 9d are map views, showing initiation levels (FIGS. 9a and 9b) and termination levels (FIGS. 9c and 9d) of the mapped vertical anomalies. Both overall (FIGS. 9a and 9c) and detailed (FIGS. 9b and 9d) levels are shown. Deep initiation, as indicated in FIG. 9a, is generally below level 9 (corresponding to the top of the Jurassic age formation in FIG. 2) of the stratigraphic levels listed in Table 2 below, whilst shallow initiation is above level 9. The detailed initiation levels indicated in FIG. 9b are subdivided into 8 levels, whilst the detailed termination levels indicated in FIG. 9d are specified to 12 levels.

Superposed in FIGS. 9a to 9d as curved black lines is the outline of the inferred gas cap within the reservoir. The boundary of the study area is indicated by the polygon 110. The location of platform areas are indicated by the black dots labelled A, B, C, D, E, F, G, H and I in FIGS. 9a to 9d. Termination levels at stratigraphic levels 1 to 12 of Table 2 are indicated in FIG. 9d.

In the case of the study of FIGS. 2 and 3a to 3c, there seems to be no overall pattern in the areal distribution of the initiation levels, with deep and shallow initiation levels occurring throughout the study area, as indicated in FIGS. 9a and b. However, as shown in Table 1 there is a small majority of anomalies initiating from the deeper levels at 1200-1600 TWT (ms) and 1600-1900 TWT (ms) (55%). This may indicate that the majority of the anomalies have a deeper origin which could be related to the thermogenic gas system i.e. formed during secondary gas migration from the reservoir.

TABLE 1

Distribution of approximate initiation levels for
the vertical anomalies. Compare with FIG. 9b.

| TWT (ms) level | Overall level | Number of anomalies | Percentage |
|---|---|---|---|
| 800-1000 | Shallow | 10 | 12% |
| 1000-1200 | Deep | 12 | 14% |
| 1200-1600 | Deep | 26 | 31% |
| 1600-1900 | Deep | 20 | 24% |
| 2000-3000 | Deep | 16 | 19% |
| Total | — | 84 | 100% |

Table 2 provided below gives a stratigraphic distribution of termination levels for some of the vertical anomalies, and can be compared with FIG. 9d. Table 2 highlights the observed detailed termination levels, with 37% of the anomalies terminating above the reservoir succession, 39% terminating within the reservoir succession and 24% terminating at levels below the reservoir succession. The anomalies terminating above the reservoirs tend to occur in the central and northern part of the study area, while there is a predominance of anomalies with termination at reservoir level in the southern part of the study area (FIGS. 9c and 9d).

TABLE 2

| Level | Stratigraphic level | No. of terminations | Percentage |
|---|---|---|---|
| Above Reservoir | 1 | 1 | 1% |
| | 2 | 15 | 18% |
| | 3 | 15 | 18% |
| | 4 | 11 | 13% |
| | 5 | 2 | 2% |
| Reservoir | 6 | 12 | 14% |
| Below reservoir | 7 | 7 | 8% |
| | 8 | 1 | 1% |
| | 9 | 8 | 10% |
| | 10 | 6 | 7% |
| | 11 | 1 | 1% |
| | 12 | 5 | 6% |
| Total | | 84 | 99% |

74% of the mapped vertical anomalies of the study occur at fault planes interpreted at reservoir-level, while 26% appear to have no association with faults, as indicated in FIG. 10, which is a map view showing the distribution of the velocity anomalies (in blue) in relation to the reservoir scale faults (in yellow). Of the fault-related anomalies 63% occur at the primary fault trend (47% of all anomalies), 26% occur at the intersection between the two fault trends (19% of all anomalies), and only 11% occur at the secondary fault trend (8% of all anomalies). This relationship suggests that the primary fault trend (WNW-ESE) has been of major importance in the generation and distribution of the vertical anomalies mapped in the present study.

Several geological phenomena can give rise to vertically extensive seismic anomalies with a circular to semi-circular map view expression, such as stacked paleo-pockmarks (Andresen & Huuse, "Bulls-eye' pockmarks and polygonal faulting in the Lower Congo Basin: relative timing and implications for fluid expulsion during shallow burial". Marine Geology 279, 111-127), surface karst, sinkholes and dissolution collapse (e.g. Hardage et al., 1996, "3-D seismic evidence of the effects of carbonate karst collapse on overlying classic stratigraphy and reservoir compartmentalization" Geophysics, 61, 1336-1350; McDonnell et al., "Quantifying the origin and geometry of circular sag structures in northern Fort Worth Basin, Tex.: Paleocave collapse, pull-apart fault systems, or hydrothermal alteration?" AAPG Bulletin 91 (9), 1295-1318; Stewart, "Seismic interpretation of circular geological features", Petroleum Geoscience 5, 273-285, 1999), fault related tectonic sags and other fault anomalies, salt diapirs and salt dissolution (e.g. Stewart, "Seismic interpretation of circular geological features", Petroleum Geoscience 5, 273-285, 1999), gas chimneys (Løseth et al., 2009, "Hydrocarbon leakage interpreted on seismic data", Marine and Petroleum Geology 26, 1304-1319), fluid expulsion pipes (e.g. Berndt, "Focused fluid flow in passive continental margins", Philosophical Transactions, Series A. Mathematical, Physical and Engineering Sciences 363, 2855-2871, 2005; Moss & Cartwright, "The spatial and temporal distribution of pipe formation, offshore Namibia", Marine and Petroleum Geology 27, 1216-1234, 2010), mud volcano systems (Stewart & Davies, "Structure and emplacement of mud volcano systems in the South Caspian Basin", American Association of Petroleum Geologists Bulletin 90, 771-786, 2006) and other vertically focused fluid migration features (Cartwright et al., "Seal bypass systems", American Association of Petroleum Geologists Bulletin 91, 1141-1166, 2007).

The carbonate environment of this study makes karst-related features such as surface karst, sinkholes and dissolution collapse depressions very likely candidates for the origin of the vertical anomalies. Additionally, since the study area is heavily faulted and many of the anomalies are fault-related, tectonic sags are likely to account for several of the anomalies. There also appear to be some candidates for true gas chimneys among the vertical anomalies (Table 3).

TABLE 3

| Generic Origin | | Reflection configuration | Seismic amplitude | Velocity | Mode of formation |
|---|---|---|---|---|---|
| Karst and dissolution related (54%) | Sinkhole or collapse depressions (14%) | Larger stacked depressions. Erosion may be observed. Continuous reflection across | Good continuity, good coherence, not much acoustic disturbance | Typically medium velocities | Deep/subsurface karst processes, collapse of cave roofs |
| | Surface karst (40%) | Narrow depressions, typically with no apparent stacking of reflections | High amplitudes in depressions, much acoustic reflections | Lower velocities, occasionally higher velocities | Shallow dissolution or surface karst giving rise to depressions |

TABLE 3-continued

| Generic Origin | | Reflection configuration | Seismic amplitude | Velocity | Mode of formation |
|---|---|---|---|---|---|
| Fault related (36%) | Tectonic sags (22%) | Broad depressions next to fault plane. Often low coherency | Broad depressions next to fault plane. Often low coherency | Typically low to medium velocities | Depressions or "graben-like" features forming in response to faulting |
| | Other fault anomalies (22%) | Discontinuous | Discontinuous | Low to medium velocities | Faulting associated changes in the sediments |
| | Gas chimneys (8%) | Broad zone with no or very discontinuous reflections. Occasionally upward deformed reflections | Broad zone with no or very discontinuous reflections. Occasionally upward deformed reflections | Low velocities, typically lateral effects, medium to high API gravities, termination, deep initiation levels | Upward moving fluids, effecting original strata configuration. Pull-up and acoustic distortion probably due to gas. High amplitudes could be due to cementation |

The fluid migration system in the study area includes several potentially migrating fluids such as thermogenic oil, thermogenic gas, biogenic gas (shallow gas), ground water and hot formation water, as can be seen from FIG. 11. FIG. 11 is a simplified diagram showing potential fluids in the study area. Red arrows indicate gas migration and green arrows indicate oil migration. FIG. 11 is not to scale, and timing is not included.

Several approaches have been used in connection with present study in order to assess whether the vertical anomalies may be associated with fluid migration. These include observations of acoustic disturbance, continuity, coherency, reflection strength and reflection configuration within the anomalies and the velocity signature. In this connection low velocity anomalies may be related to the presence of gas in the sediment and high velocity anomalies may reflect cemented conduits also forming during fluid migration. Lateral effects associated to the velocity anomalies are potentially a positive indicator of fluid migration revealing secondary alterations of the near-by sediments resulting from upward fluid migration within the vertical conduit.

FIG. 12 is a diagram (not to scale) illustrating the possible relations between fluid migration (red arrows) and faults, surface karst, sinkholes, and gas chimneys. Based on the analysis of the present study it is concluded that the majority of the mapped vertical anomalies are related to fluid flow. Fluid migration is thought to be involved in the formation of the vertical anomalies in three ways, as indicated schematically in FIG. 12 and as discussed below:

1) Fluid migration along fault zones.

Fault zones acting as weakness zones and competent fluid migration routes. Due to the high density of faults in the study area, this is proposed as the main mode for vertical fluid migration.

2) Fluid migration in relation to sinkholes and shallow karst features

Karst processes could be facilitated and/or enhanced by focused fluid migration. Alternatively, sinkholes and surface karst could represent already established weakness zones and hence preferred fluid migration routes.

3) Gas chimneys.

Vertically-focused fluid migration along conventional acoustically distorted gas chimneys with a deep initiation. The ascending fluids within the gas chimneys may cause upward deformation of the strata and/or velocity pull-up.

The three elements are closely connected and typically more than one element may have worked in the generation of the discrete vertical anomalies. For instance, sinkholes and surface karst typically occur above faults indicating that faults represent preferred fluid migration routes which facilitate and control the location of karst processes during sub-aerial exposure.

Production data and gas samples from horizontal wells suggest the presence of a distinct gas cap within the reservoir. Observations which may help explain the present day position of the gas cap are:

1) The gas cap area correlates with vertical anomalies characterised by
   a. low and medium velocities (see FIG. 8).
   b. medium to high API gravities.
   c. predominant termination levels (see FIG. 9d).
   d. predominant apparent deep initiations from the early triassic and middle to late permian levels indicated in FIG. 2 (1200 to 1600 TWT (ms)) and deeper levels (see FIG. 9b).

2) The gas cap area correlates with abundant depressions at the top of the Jurassic age formation indicated in FIG. 2.

3) The area to the north of the gas cap is associated with shallower termination levels predominantly at the top of the stratigraphic level 2 indicated in Table 1 (in the Eocene age formation indicated in FIG. 2)—see FIG. 9d.

These observations suggest that the gas cap could be associated with vertical gas migration from a deeper succession (stratigraphic level 3 of Table 1) into the reservoir succession. The areal extent of the gas cap appears to be strongly related to the north-south variation in termination levels. To the north the majority of the vertical anomalies continue above the reservoirs to the top of the stratigraphic level 2 formation indicated in Table 1 (Eocene), thereby bypassing the deeper reservoirs and apparently preventing gas cap formation. However shallower reservoirs have gas in northernmost part, which may be associated with lateral migration of gas. To the south the vertical anomalies terminate within the reservoir succession and possibly facilitate the formation of the gas cap.

The study discussed above in relation to FIGS. 2 to 12 presents a detailed analysis of abundant vertical anomalies found in relation to an oil field under investigation. The analysis was carried out with two main objectives aiming to accomplish a better understanding of:
  a) the charging history of the field
  b) the migration routes into the field The results of the analysis provide insight relevant to both objectives and may contribute to the further development of the field. A main element of the analysis was the successful implementation of an interval velocity volume in the seismic interpretation, and 84 distinct vertical velocity anomalies were mapped. The velocity anomalies are characterized by anomalous vertically extensive and typically lower interval velocities than the surrounding strata. Fluid migration is interpreted to have occurred along the majority of the velocity anomalies and they may thus be characterized as vertical fluid migration routes.

The velocity anomalies have been subdivided into five primary genetic origins including gas chimneys, surface karst, sinkholes/collapse depressions, fault-related tectonic sags, and other fault-related anomalies. Fluid migration is interpreted to occur along fault planes, gas chimneys, and karst features and may also have facilitated dissolution of the carbonates in certain areas. Major controlling factors for the formation and timing of the velocity anomalies includes: faulting, source rock maturation, paleotopography (distribution of structural highs), and periods of sub-aerial exposure. Faulting and source rock maturation are the primary controlling factors.

The majority of the velocity anomalies of the present study were generated 70-50 Ma ago and are related to major faulting and gas expulsion from the source rock. Oil charging of the Field occurred later (<45 Ma) and re-use of the already established fluid migration routes probably represented a critical element of the charging.

A gas cap is present in the study area. The inferred area of the gas cap correlates with velocity anomalies that generally are characterised by:
  a) medium to high oil gravities within the reservoirs
  b) low to medium velocities
  c) terminations at reservoir level
  d) apparent deep initiation levels These observations suggests that the gas cap is related to gas and secondary vertical gas migration from the reservoirs, rather than being merely associated gas. In the northern part the velocity anomalies terminate at much shallower depths (at the top of stratigraphic level 2 of Table 2, Eocene) indicating bypass of the reservoirs.

As discussed above, it has been shown that for the present study the presence of fluid migration features can be determined from anomalies, in this case vertical anomalies, in seismic velocity data. In turn, the fluid migration features can be correlated with the presence and location of oil or gas deposits.

As well as modelling the charging history or migration routes for existing known oil or gas deposits, as is the case the for study described above, the embodiment of FIG. 1 can also be used for predictive purposes, for example to predict the location of possible oil or gas deposits, and/or to select regions for further exploration or analysis.

In one mode of operation, seismic speed/velocity data and/or amplitude data for a region is processed by the processing system of FIG. 1 to determine the presence of speed/velocity anomalies (or amplitude anomalies) that may be associated with fluid migration features and to select a region for further exploration or analysis based on the presence and location of such speed/velocity anomalies (or amplitude anomalies).

If fluid migration features are determined to be present, based on the presence of the speed/velocity anomalies of suitable characteristics, then in some modes of operation a region is selected for further exploration or analysis if the vertical anomalies (and hence the fluid migration features) are proximate to, terminate at, lead to or from the region, as that suggests that fluid (e.g. oil or gas) may have migrated to that region.

The selection of a region for further exploration or analysis may also be based on further seismic or other measurements, that support the conclusion that the speed/velocity anomalies may be associated with fluid migration features, and will also usually be based on an assessment of the general geology of the region and its surroundings to determine whether it is likely that oil or gas may have migrated along the fluid migration features.

The region may be selected in dependence on the number, concentration or size of anomalies associated with said region, for example the number, concentration or size of identified anomalies proximate to, terminating at, leading to or from said region, or extending wholly or partly within said region. For instance, a region may only be selected in some cases if the number, concentration or size of the anomalies suggest that a significant amount of oil or gas may have migrated to the region.

The further exploration or analysis may involve further processing of seismic or other data, performance of further seismic or other measurements, or performance of a physical intervention, for instance an exploratory drilling operation, to determine the presence of oil or gas or to provide a more accurate assessment of whether oil or gas may be present in the region.

In some embodiments, a mapping is performed by the processing system to determine where fluids, for example, hydrocarbon fluids, may have moved in dependence on the presence, position, size, concentration or other property of the identified at least one fluid migration feature. The selection of the region for further exploration or analysis may then be performed in dependence on the mapping.

In some embodiments, a further or more detailed analysis is performed to determine whether anomalies in speed and/or velocity and/or amplitude data may represent significant potential fluid migration routes. For example, such anomalies may be correlated with other seismic or other measurements, or it may be determined whether a property or properties of each anomaly match a predetermined pattern, for example whether a speed/velocity or amplitude profile matches a predetermined pattern. In some cases, size (e.g. width, length, volume) thresholding may be applied to select the most significant anomalies.

It has been found the detection of speed/velocity and/or amplitude anomalies can provide a simple and effective way to determine the presence and location of possible fluid migration features. Knowledge of the presence and location of such possible fluid migration features can in turn be used to predict the location of possible oil or gas deposits, or at least be used in selecting regions for exploration or further analysis or measurement.

Embodiments, or features of such embodiments, can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example, microwave or infrared. The series of computer instructions can constitute all or part of the functionality described herein, and can also be stored in any memory device, volatile or non-volatile, such as semiconductor, magnetic, optical or other memory device.

It will also be well understood by persons of ordinary skill in the art that whilst embodiments implement certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

It will be understood that embodiments of the present invention are described purely by way of example, and modifications of detail can be made within the scope of the invention. Each feature disclosed in the description, and (where appropriate) the drawings may be provided independently or in any appropriate combination.

The invention claimed is:

1. A method of identifying at least one fluid migration feature, comprising:
    receiving seismic data comprising seismic amplitude data and seismic speed or velocity data;
    processing the seismic amplitude data to identify at least one substantially vertical anomaly in the seismic amplitude data;
    processing the seismic speed or velocity data to identify at least one substantially vertical anomaly in the seismic speed or velocity data;
    selecting one or more of the substantially vertical anomalies in the seismic speed or velocity data for which there is a corresponding substantially vertical anomaly in the seismic amplitude data;
    determining the presence of at least one hydrocarbon fluid migration feature based on the presence of said selected one or more of the substantially vertical anomalies in the seismic speed or velocity data for which there is a corresponding substantially vertical anomaly in the seismic amplitude data; and
    selecting a region for further exploration or analysis for the presence of oil or gas, in dependence on the number, concentration or size of the selected anomalies in the seismic speed or velocity data for which there is a corresponding substantially vertical anomaly in the seismic amplitude data, and that are proximate to, leading to or from said region, or extending wholly or partly within said region.

2. The method according to claim 1, wherein:
    the identifying of the at least one fluid migration feature comprises determining the presence of the at least one fluid migration feature.

3. The method according to claim 1, further comprising:
    determining whether the identified speed or velocity anomaly, and/or the identified amplitude anomaly matches a desired pattern or possesses at least one desired property.

4. The method according to claim 3, wherein the desired pattern or at least one desired property represents a variation of velocity or speed with lateral position, or a variation of amplitude with lateral position.

5. The method according to claim 3, wherein the pattern is representative of higher velocity or speed at the centre of a velocity anomaly region and lower velocity or speed at least one edge of a velocity anomaly region, or vice versa.

6. The method according to claim 1, further comprising:
    selecting in dependence on depth one of the speed/velocity data and the amplitude data for use in identifying the at least one anomaly.

7. The method according to claim 1, wherein the identifying of at least one of the anomalies comprises identifying the anomaly using speed or velocity data for depths less than a depth limit and identifying the anomaly using the amplitude data for depths greater than the depth limit.

8. The method according to claim 1, wherein the at least one fluid migration feature is associated with, at least one of a fracture, fault, depression, incision, karst feature, cap, channel, sinkhole, or reef feature.

9. The method according to claim 1, further comprising:
    determining at least one of a termination level or an initiation level of the anomaly from the velocity data and/or amplitude data, for example a velocity volume and/or amplitude volume obtained from the seismic data.

10. The method according to claim 1, the method further comprises:
    making a prediction as to whether said selected region or regions contain hydrocarbons, for example oil or gas.

11. The method according to claim 1, wherein the further exploration or analysis comprises further processing of seismic or other data, performance of further seismic or other measurements, or performance of a physical intervention, for instance an exploratory drilling operation.

12. The method according to claim 1, further comprising:
    mapping where hydrocarbon fluids may have moved in dependence on the presence, position, size, concentration or other property of the identified at least one fluid migration feature.

13. A non-transitory computer readable medium having computer-readable instructions stored thereon, which when executed by at least one processor, causes the at least one processor to perform a method according to claim 1.

14. An apparatus comprising a processing resource configured to:
    receive seismic data comprising seismic amplitude data and seismic speed or velocity data;
    process the seismic amplitude data to identify at least one substantially vertical anomaly in the seismic amplitude data;
    process the seismic speed or velocity data to identify at least one substantially vertical anomaly in the seismic speed or velocity data;
    select one or more of the substantially vertical anomalies in the seismic speed or velocity data for which there is a corresponding substantially vertical anomaly in the seismic amplitude data;
    determine the presence of at least one hydrocarbon fluid migration feature based on the presence of said selected one or more of the substantially vertical anomalies in the seismic speed or velocity data for which there is a corresponding substantially vertical anomaly in the seismic amplitude data; and
    select a region for further exploration or analysis for the presence of oil or gas, in dependence on the number, concentration or size of the selected anomalies in the seismic speed or velocity data that are proximate to, leading to or from said region, or extending wholly or partly within said region.

* * * * *